March 11, 1958 B. N. FISHER 2,826,687

FREQUENCY SELECTOR

Filed Aug. 16, 1954 9 Sheets-Sheet 1

INVENTOR.
BERNE FISHER

BY
Strauch & Faber
ATTORNEYS

March 11, 1958 B. N. FISHER 2,826,687

FREQUENCY SELECTOR

Filed Aug. 16, 1954 9 Sheets-Sheet 2

INVENTOR.
BERNE FISHER

BY

Ostrolenk & Faber
ATTORNEYS

FREQUENCY SELECTOR

Filed Aug. 16, 1954 9 Sheets-Sheet 3

INVENTOR.
BERNE FISHER

BY

Ostrolenk & Faber
ATTORNEYS

INVENTOR.
BERNE FISHER
BY
Ostrolenk & Faber
ATTORNEYS

INVENTOR.
BERNE FISHER
BY
Ostrolenk & Faber
ATTORNEYS

FREQUENCY SELECTOR

Filed Aug. 16, 1954

9 Sheets-Sheet 6

INVENTOR.
BERNE FISHER
BY
Ostrolenk & Faber
ATTORNEYS

INVENTOR.
BERNE FISHER

BY

Ostrolenk & Faber
ATTORNEYS

INVENTOR.
BERNE FISHER
BY
Ostrolenk & Faber
ATTORNEYS

March 11, 1958

B. N. FISHER 2,826,687

FREQUENCY SELECTOR

Filed Aug. 16, 1954

9 Sheets-Sheet 9

INVENTOR.
BERNE FISHER

BY

Ostrolenk & Faber
ATTORNEYS

United States Patent Office 2,826,687

Patented Mar. 11, 1958

2,826,687

FREQUENCY SELECTOR

Berne N. Fisher, Arcadia, Calif., assignor to Standard Coil Products Co., Inc., Los Angeles, Calif., a corporation of Illinois Application August 16, 1954, Serial No. 450,010

5 Claims. (Cl. 250—20)

The present invention relates to a frequency selector and more particularly it relates to a frequency selector for use at television frequencies.

Prior to the advent of U. H. F., all television sets manufactured in the United States were provided with frequency selectors capable generally of selecting the twelve V. H. F. channels.

One of the most popular types employs a turret which switches in tuned circuits across stationary circuit elements such as amplifier, oscillator and converter tubes. Television sets in which such turret tuners are used are generally provided with an appropriate space in their front end having the approximate dimensions of this tuner. In particular, the cross-sectional dimensions of this space in the television chassis conform very closely to the cross-sectional dimensions of this turret type tuner since the turret type tuner is mounted close to the front of the television picture tube where space is at a premium, especially in the transverse dimensions.

The advent of U. H. F. created a demand for a U. H. F. television tuner capable of selecting all the U. H. F. television channels and having approximately the same cross-sectional dimensions as the V. H. F. tuner so that the mounting problem in a television set chassis would be considerably reduced.

It was further desired to have a combination U. H. F. and V. H. F. tuner controllable by the least number of knobs, these knobs possibly operating coaxially so as to facilitate channel selection by the television set user.

It is further known that each particular locality will receive at most a few U. H. F. stations distributed in the U. H. F. range which goes from approximately 450 to 850 megacycles. Since the frequency location of these stations is different for different locations and the number of channels in the U. H. F. range is approximately seventy, it has also been found that it is more convenient to have a continuous tuner for operation at U. H. F. such that the operator can easily select the approximate location of the station receivable by his set and then by a fine tuning adjustment accurately position his tuner for selection of the desired station.

This is, of course, in contrast with the turret type tuner which is essentially a discrete tuner and is constructed so that rotation of a single knob will tune in the required signal without any additional need for fine tuning except when a final adjustment of the picture is desired.

In other words, because of the distribution of U. H. F. channels in the U. H. F. range, it appears to be more practical to have a tuner capable of going very quickly through a number of channels with an additional control for finally selecting the desired channel.

The frequency selector of the present invention is a combination V. H. F.–U. H. F. tuner in which the V. H. F. section is a modified turret type tuner, while the U. H. F. section having approximately the same cross-sectional dimensions as the V. H. F. tuner is of the continuous type so as to permit the continuous selection of any channel in the U. H. F. range.

Accordingly, one object of the present invention is a frequency selector for operation at U. H. F. and capable of receiving the seventy channels in the U. H. F. range and yet having approximately the same cross-sectional dimensions as present V. H. F. turret tuners.

Another object of the present invention is a combination V. H. F.–U. H. F. tuner in which V. H. F. channels are individually selected by switch action, while the U. H. F. channels are continuously selected.

Still another object of the present invention is a V. H. F.–U. H. F. tuner combination in which the U. H. F. tuner has a coarse tuning control and a fine tuning control, the first to set the tuner approximately in the right position for reception of a U. H. F. channel, the second to accurately select the U. H. F. channel desired.

The present U. H. F. tuner is constructed around a novel element, namely a line having a curved shape so that it represents essentially a distributed inductance and capacitance of the correct value and of very high Q. The line is terminated by a set of plates which operate as the stator plates of a tuning capacitor.

By curving the line while on the one hand the desired inductance is thus obtained with a very high Q, on the other hand, it became possible to house the line within a housing of cross-sectional dimensions equal to those of the V. H. F. tuner. The stator plates of these lines extend from the bottom of the tuner close to the main operating shaft of the tuner where the corresponding rotor plates are mounted. Operation of this shaft thus tunes the U. H. F. tuner.

Accordingly, another object of the present invention is a novel tuning device consisting of a curved line terminated at one end by a variable capacitor.

A further object of the present invention is a tuning device having a high Q and the desired frequency characteristics.

One of the problems encountered in any tuner, but particularly important in tuners operable in the U. H. F. range, is that of providing good tracking between the oscillator converter section and the preselector section. This is achieved in the present invention by the use of grounded resilient conductive members mounted to the chassis in proximity to the preselector lines. The oscillator line, on the other hand, is provided with an extra end plate and facing that plate mounted from the front end of the U. H. F. chassis is a screw, the position of which with respect to this additional stationary plate serves to provide a tracking adjustment of the oscillator with respect to the preselector.

Accordingly, a further object of the present invention is the provision of means for appropriately tracking the oscillator and preselector of a U. H. F. tuner.

In particular, another object of the present invention is the provision of means for adjusting the frequency of oscillation of a U. H. F. tuner from the front end of a V. H. F.–U. H. F. tuner combination.

It is well known that the coil of the V. H. F. oscillator may also require some adjustment in inductance after the tuner is assembled. In the present invention, this is easily done again from the front end of the U. H. F. tuner by the provision of appropriate aligned openings. Thus, there are two positions in the front end of the U. H. F. tuner, one for adjustment of the frequency of oscillation of the U. H. F. oscillator and the other for adjusting the frequency of oscillation of the V. H. F. oscillator.

On the other hand, a friction angular reduction mechanism is mounted on the front end of the present U. H. F. tuner which would make it impossible for a screw driver to be inserted for adjustment of the frequency of oscillation. One of the members of this reduction mechanism is provided, however, with an appropriate set of openings which successively come into alignment with one and the other of the two oscillator trimming screws to permit the insertion of a screw driver and, therefore, adjustment of these frequencies.

Accordingly, another object of the present invention is a V. H. F.–U. H. F. tuner whose frequency of oscillation can be easily adjusted from the front end of the U. H. F. section.

The U. H. F. tuner consists of a local U. H. F. oscillator, a semi-conductor mixer and input coil, the tuning elements and coupling coils.

In the present invention, the input coil and the antenna terminal constitute a separate sub-assembly. The crystal mixer and its related electrical components constitute a second sub-assembly. The rotor plates constitute with their operating shaft still another sub-assembly so that the U. H. F. tuner may be considered to be formed of a number of separate sub-assemblies which can be individually built and mounted together in a final process.

Accordingly, another object of the present invention is a U. H. F. tuner which is easily manufactured.

The foregoing and many other objects of the invention will become apparent in the following description and drawings in which:

Figure 1 is a schematic circuit diagram of the V. H. F.–U. H. F. tuner combination of the present invention.

Figure 2 is a side view of the U. H. F. tuner of the present invention showing in detail the U. H. F. section.

Figure 3 is a top view of the U. H. F.–V. H. F. combination of the present invention.

Figure 4 is a detail view of the U. H. F. tuner of the present invention as seen from the bottom of this novel tuner.

Figures 5, 6, and 7 are schematic views for describing the operation of the novel controlling means of the present invention.

Figure 8 is a cross-sectional view of the U. H. F. tuner of the present invention taken along line 8—8 of Figure 2 and looking in the direction of the arrows showing the oscillator line and its relationship with the other elements of the oscillator section.

Figure 9 is another cross-sectional view of the U. H. F. tuner of the present invention taken along line 9—9 of Figure 2 and looking in the direction of the arrows showing one of the preselector lines and its relative position with respect to its rotor plates.

Figure 9:
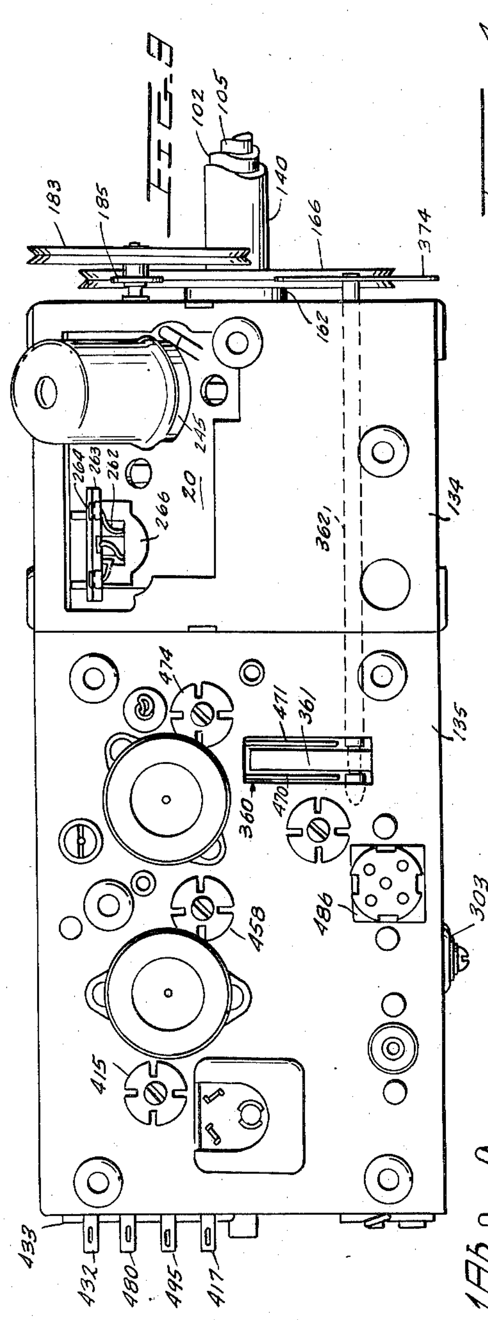
Figure 4:
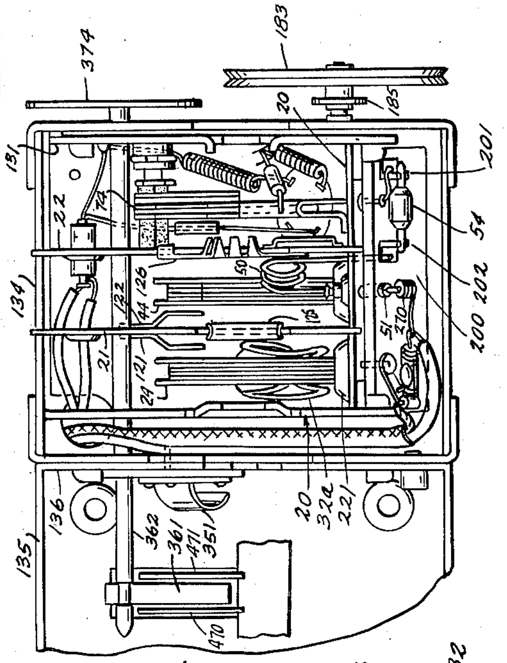
Figures 8, 9, 10, 11, 12, 13, 14A, 14B:
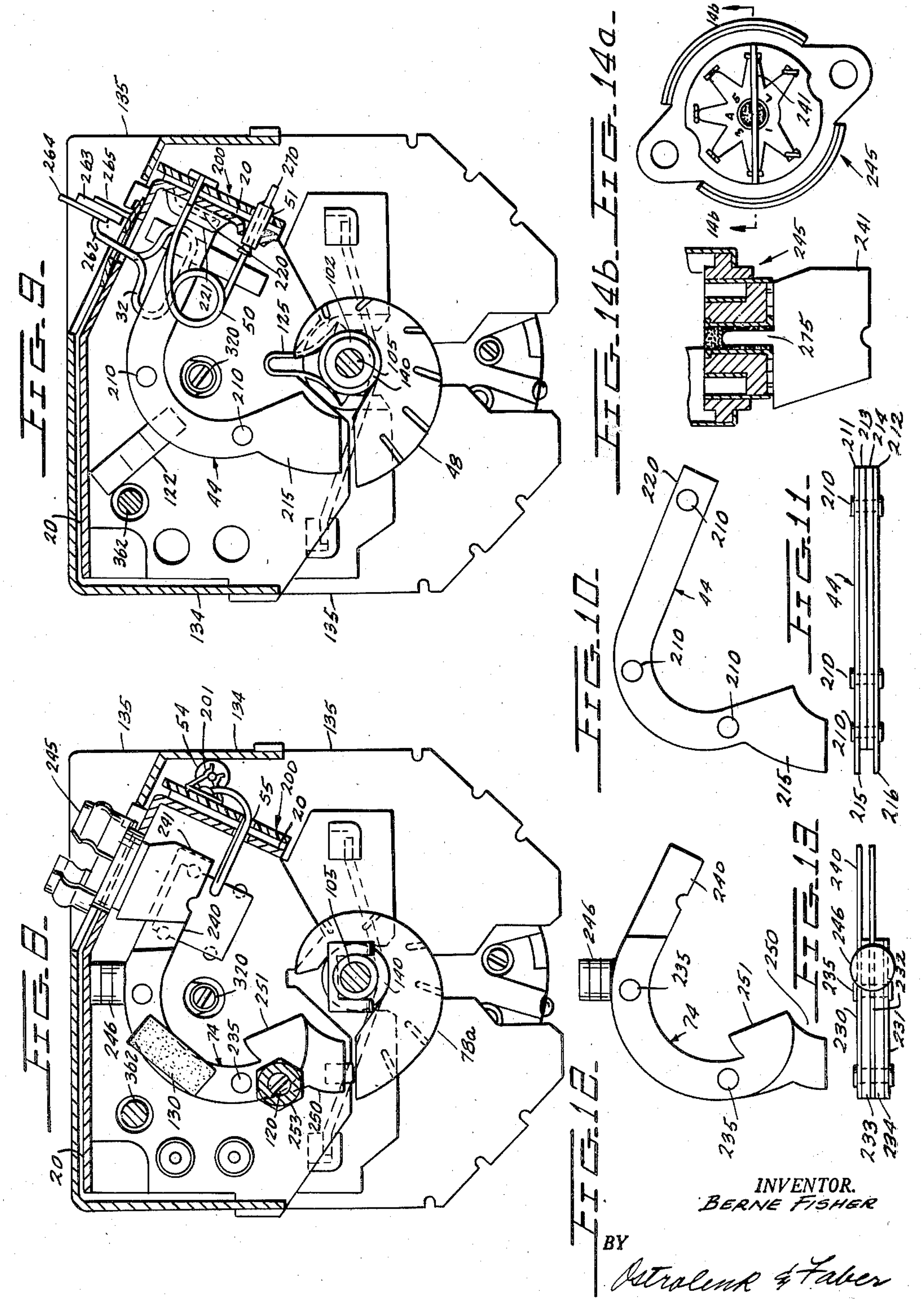
Figure 10 is a detail view of the preselector line.
Figure 11 is a top view of the line of Figure 10.
Figure 12 is a detail view of the oscillator line.
Figure 13 is a top view of the line of Figure 12.

Figure 14A is a bottom view of the U. H. F. oscillator tube socket showing the connecting means between the tube socket and the oscillator line.

Figure 14B is a cross-sectional view of the socket of Figure 14A.

Figures 15, 16, 17, 19, 20, 21A, 21B, 38, 39:
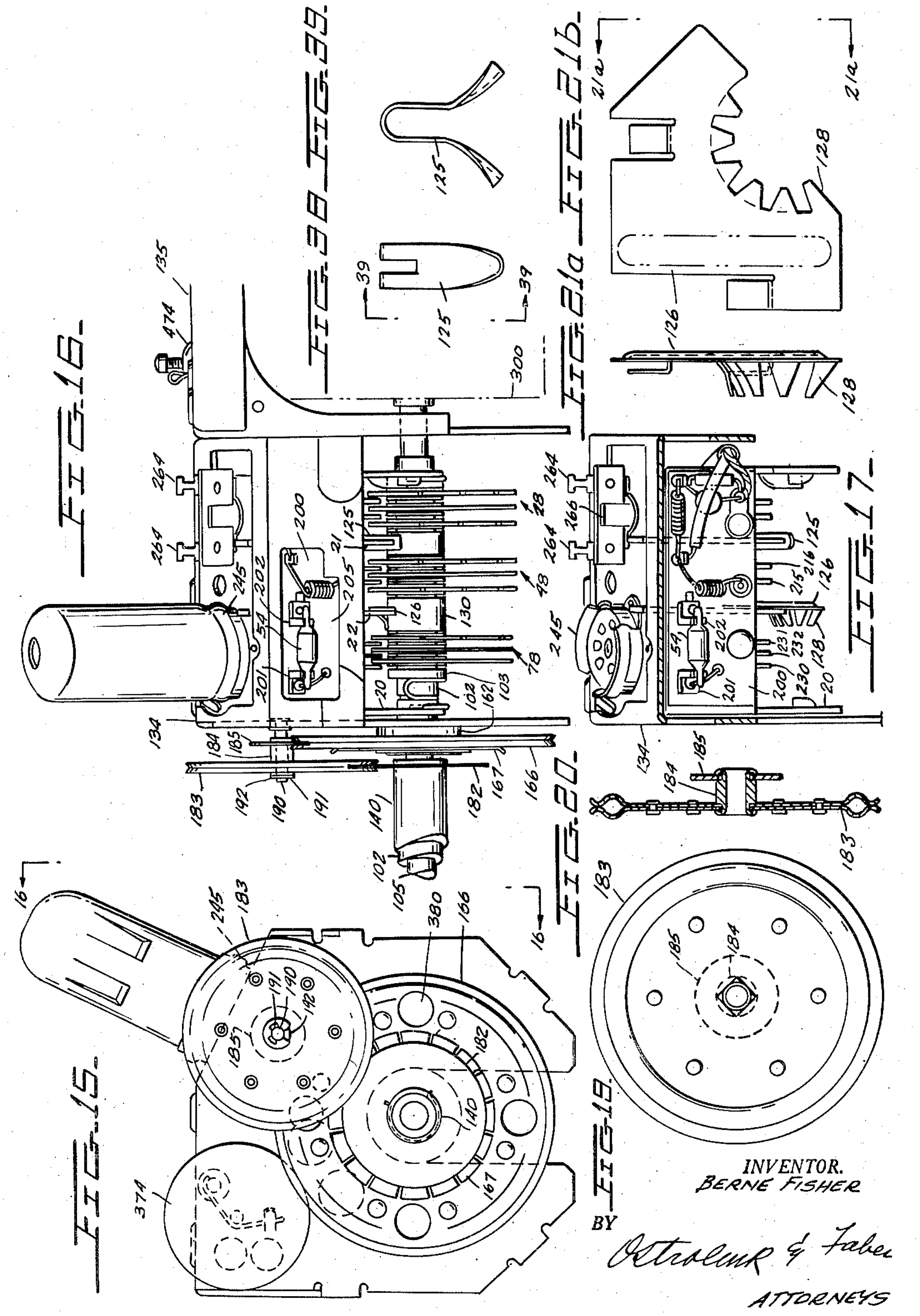

Figure 15 is a front view of the V. H. F.–U. H. F. tuner combination of the present invention.

Figure 16 is another side view of the U. H. F. tuner of the present invention showing the crystal mixer assembly.

Figure 17 is a detail view of the U. H. F. tuner of the present invention showing the relative position of the U. H. F. oscillator tube socket, antenna coupling coil sub-assembly and crystal mixer sub-assembly.

Figure 18C:
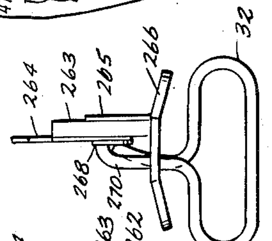
Figure 18B:
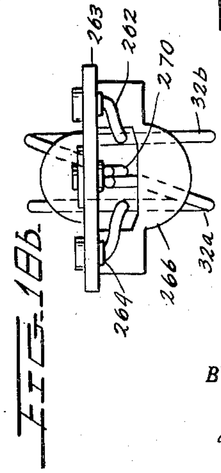
Figure 18A:
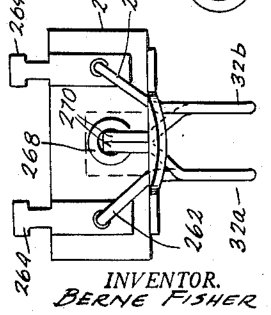

Figure 18A is a detail view of the antenna coupling coil-sub-assembly.

Figure 18B is a top view of the antenna coupling coil sub-assembly of Figure 18A.

Figure 18C is a side view of the antenna coupling coil sub-assembly of Figure 18A.

Figure 19 is a front view of one of the friction members of the controlling device of the present invention.

Figure 20 is a cross-sectional view of the friction member of Figure 19.

Figure 21A is a detail side view of the wiping contacts used in the U. H. F. tuner of the present invention.

Figure 21B is a front view of the wiping contacts used in the U. H. F. tuner of the present invention.

Figures 22, 23, 24, 25:
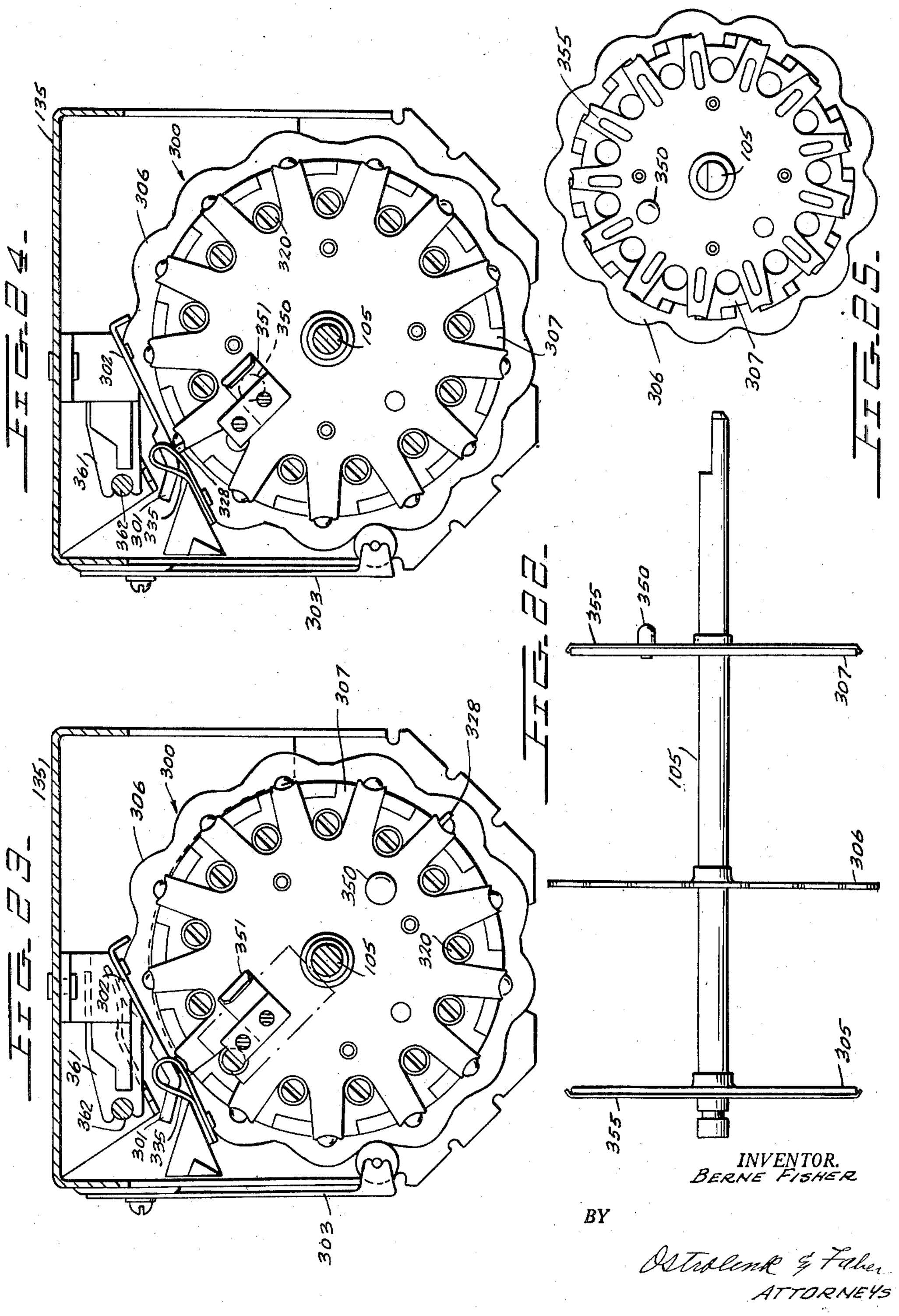

Figure 22 is a detail view showing the three mounting discs for the V. H. F. tuner of the present invention.

Figure 23 is an end view of the V. H. F. tuner of the present invention showing the turret of the V. H. F. tuner of the present invention during V. H. F. reception.

Figure 24 is an end view of the V. H. F. tuner of the present invention showing the turret of the V. H. F. tuner of the present invention during U. H. F. reception.

Figure 25 is a front view of the V. H. F. tuner of the present invention showing the panel holding means.

Figure 26:
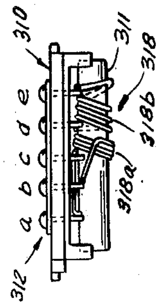

Figure 26 is a side view of the V. H. F. antenna panel.

Figure 27:
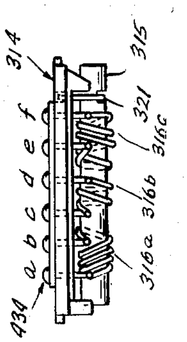

Figure 27 is a side view of a V. H. F. oscillator converter panel.

Figure 28:
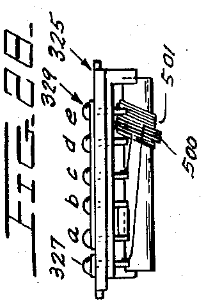

Figure 28 is a side view of one of the I. F. panels used in the present invention during U. H. F. reception.

Figure 29:
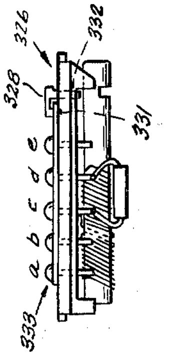

Figure 29 is a side view of the second of the I. F. panels used in the present invention during U. H. F. reception.

Figures 5, 6, 7, 30, 31, 32:
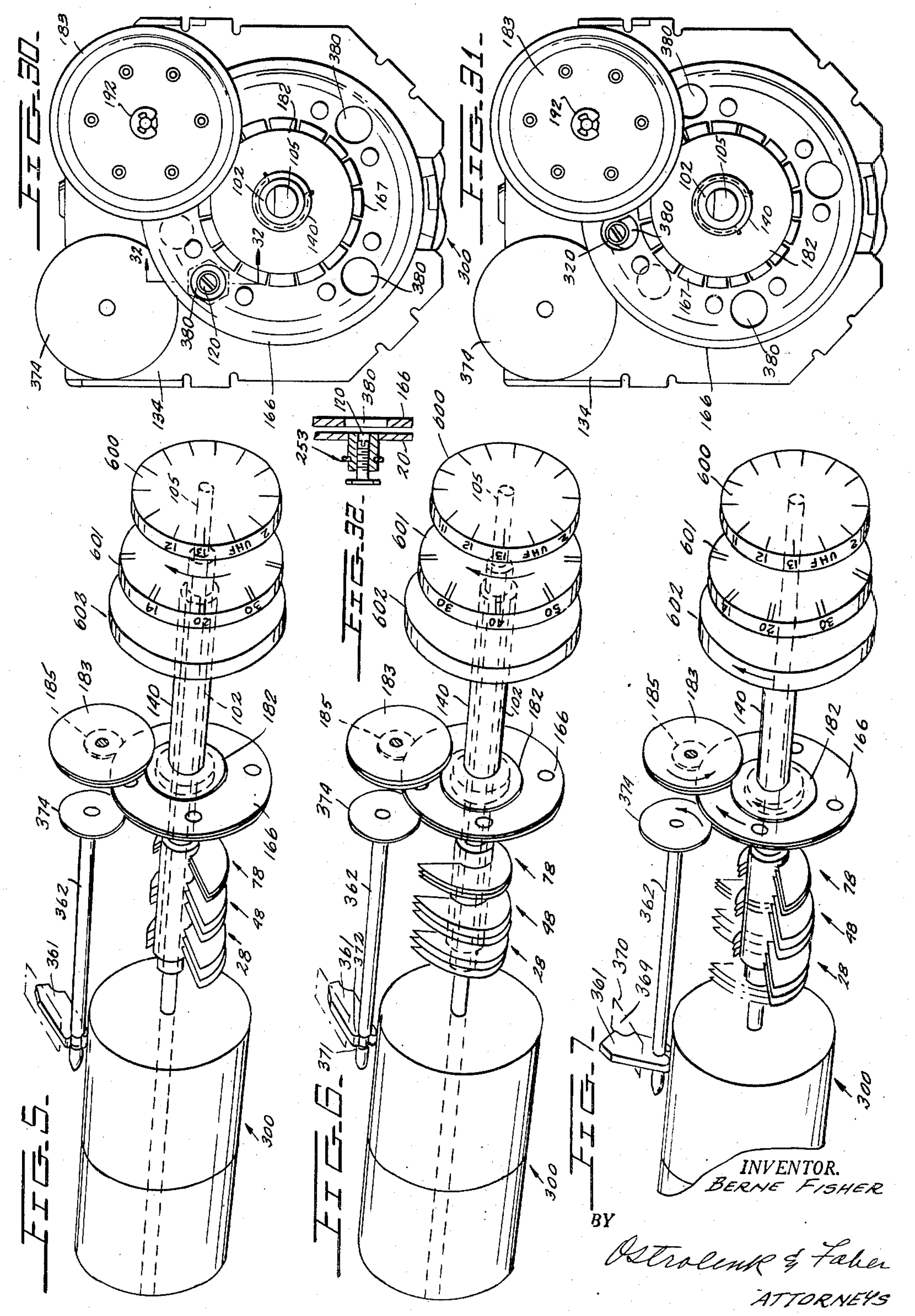

Figure 30 is a front view of the U. H. F.–V. H. F. tuner of the present invention for showing the relative position of the controlling elements when it is desired to make an adjustment of the U. H. F. oscillator.

Figure 31 is a front view of the U. H. F.–V. H. F. tuner of the present invention for showing the relative position of the controlling elements when it is desired to make an adjustment of the V. H. F. oscillator.

Figure 32 is a detail view of the U. H. F. oscillator adjusting means.

Figures 33, 34:
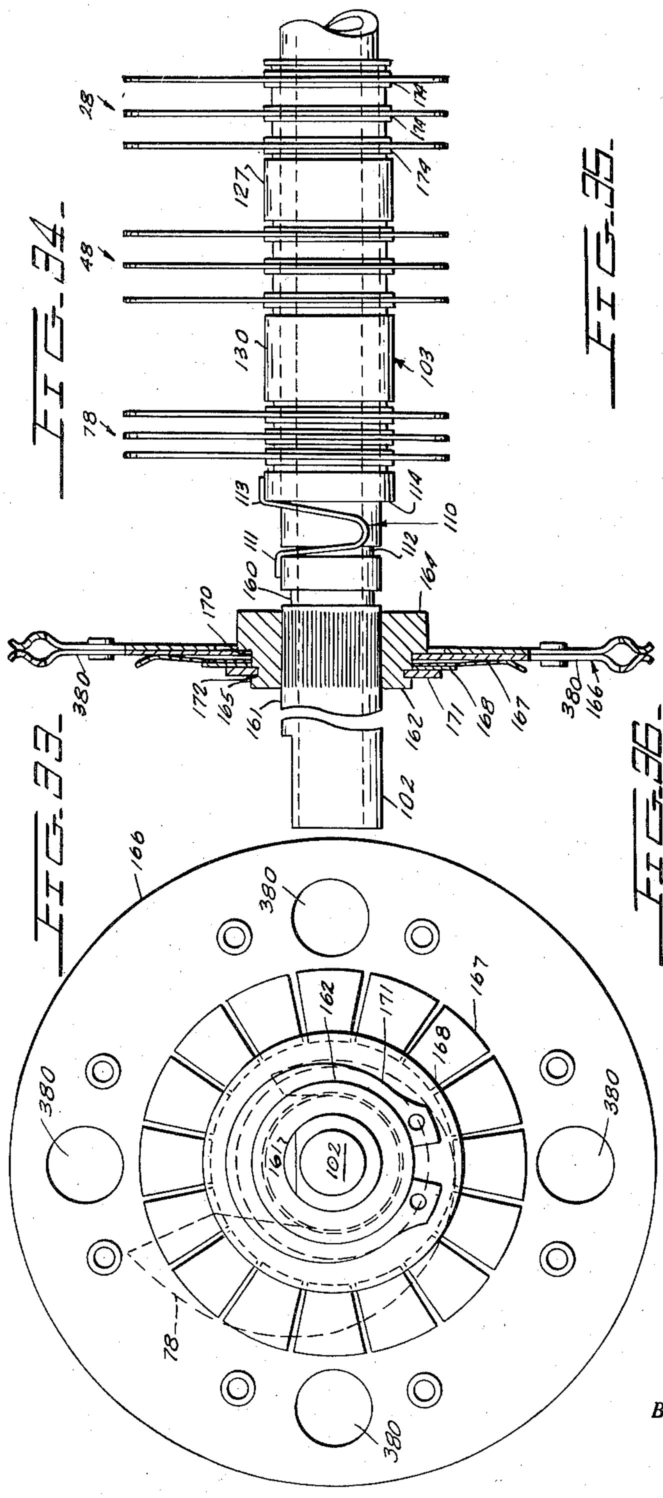

Figure 33 is a front view of the main friction disc of the controlling device of the present invention.

Figure 34 is a detail drawing of the rotor plate assembly of the U. H. F. tuner showing also a cross-section of the novel controlling means used for tuning the U. H. F. tuner.

Figure 35:
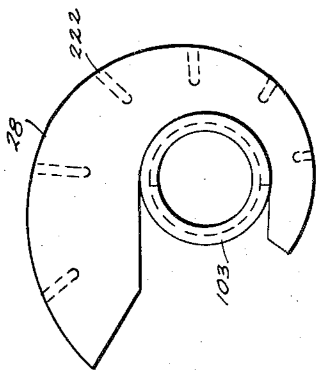

Figure 35 is a detail view of one of the preselector rotor plates.

Figure 36:
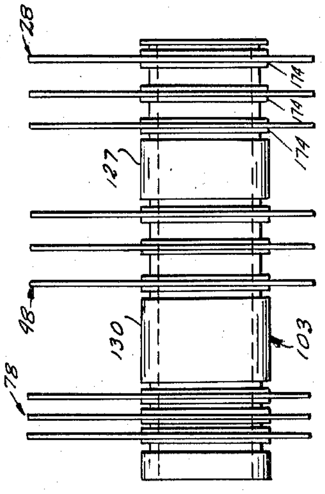

Figure 36 is a detail view of the complete rotor plate structure.

Figure 37:
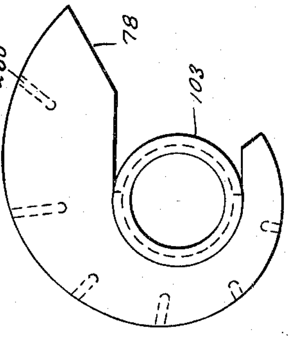

Figure 37 is a detail view of one of the rotor plates of the oscillator section.

Figure 38 is a detail side view of another type of wiping contact used in the U. H. F. tuner of the present invention.

Figure 39 is a detail front view of the wiping contact of Figure 38 used in the U. H. F. tuner of the present invention.

Figure 40:
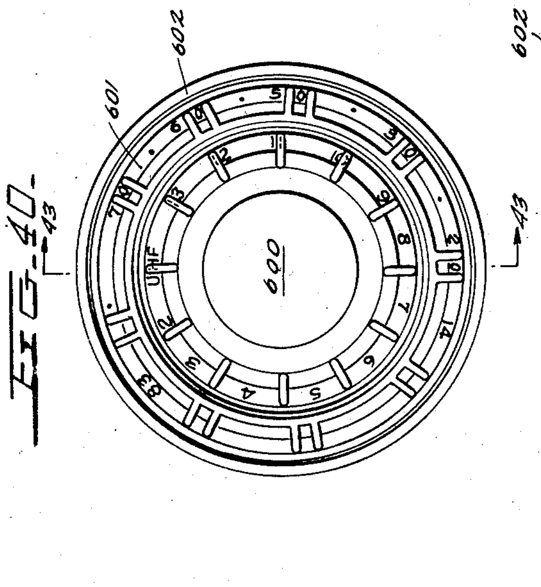

Figure 40 is a detail view of the controlling knobs of the tuner of the present invention when set for U. H. F. operation.

Figure 41:
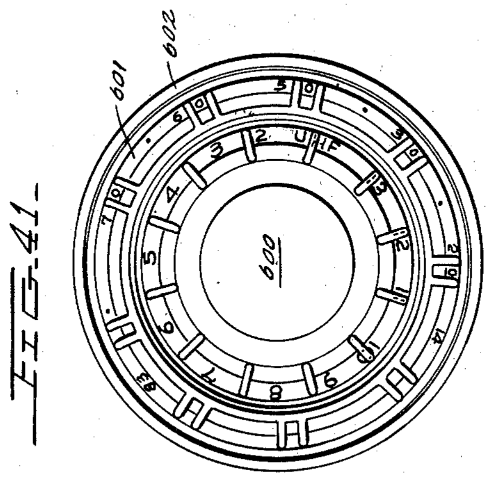

Figure 41 is a detail view of the controlling knobs of the tuner of the present invention when set for V. H. F. operation.

Figure 42:
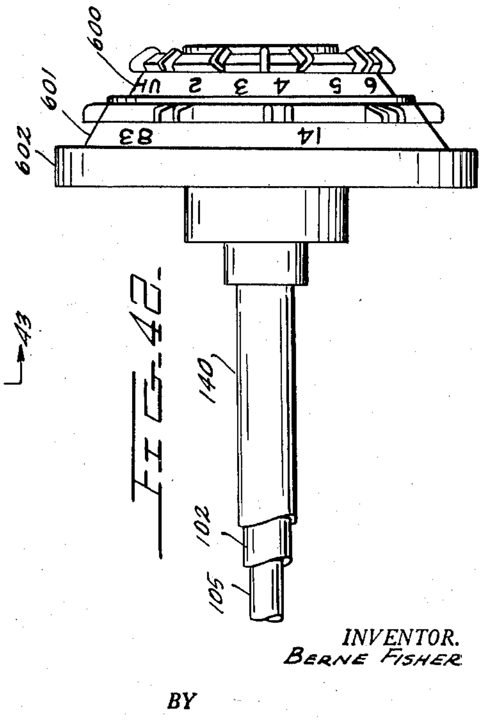

Figure 42 is a side view of the controlling knob assembly of the present invention.

Figure 43:
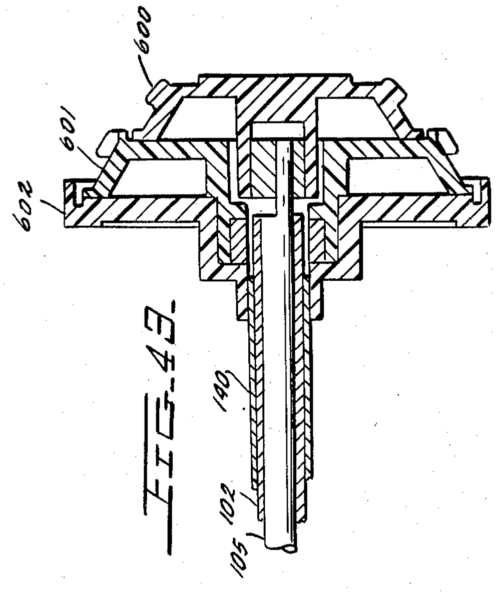

Figure 43 is a cross-sectional view of the controlling knob assembly of the present invention taken along line 43—43 of Figure 40 looking in the direction of the arrows.

Figure 1:
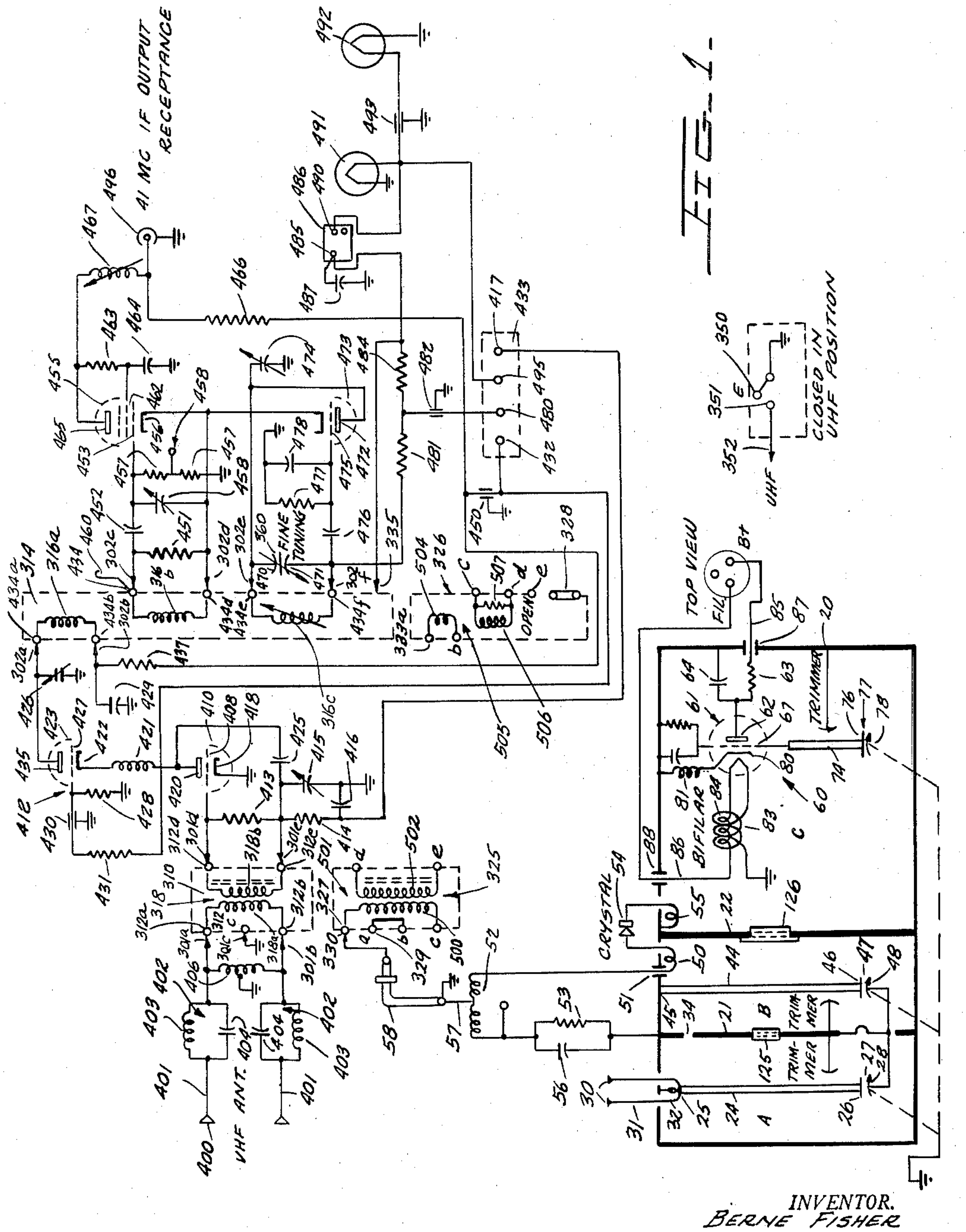

Referring first to Figure 1 showing the schematic circuit diagram of the V. H. F.–U. H. F. tuner of the present invention, it will be seen that the U. H. F. chassis 20 is divided into three sections A, B, and C by shields 21, 22.

Section A contains curved line 24 described hereinafter in connection with Figures 9, 10, and 11 being grounded at one end 25 to the chassis 20 and provided at the other end with two stator plates indicated schematically in Figure 1 at 26 of a capacitor 27 and also described hereinafter in connection with Figures 9, 10 and 11.

The other plates of this variable capacitor 27, namely the plates shown schematically at 28, are movable with respect to the plates 26 so as to vary the capacitance at the end of line 24 as indicated in Figure 1. Line 24 may be considered essentially as an inductor having a high Q tuned by means of the capacitance 27. The capacitance 27 consisting of stator plates 26 and rotor plates 28 is of the balanced type since at this point of the U. H. F. tuner, the signals being tuned are balanced.

These ultra-high frequency signals received through antenna 30 are applied through a transmission line 31 to a coil 32 having a grounded center tap and inserted in section A of chassis 20 so that it is in close proximity to line 24 to thus produce mutual coupling between the coil 32 and line 24. Since generally transmission line 31 is of the balanced type, the signal in the tuned circuit of section A, as previously mentioned, is still of the balanced type.

Shield 21 which separates sections A and B is provided with an opening 34 to permit coupling at high U. H. F. between sections A and B. Shield 21 is further provided with a ground wiper 125, described hereinafter in connection with Figures 2, 38 and 39. Ground wiper 125 is the coupling means between section A and section B for low U. H. F. signals. Section B is essentially identical to section A and it consists of a line 44 grounded to the chassis at 45 and provided with a tuning capacitor 47 having a set of stator plates 46 and rotor plates 48. Line 44 is coupled to line 24 through the previously mentioned opening 34 and wiper 125. The two capacitors 27 and 47 have their rotors ganged together and adjusted for proper tracking.

The function of section B is thus also similar to the function of section A, namely, that of selecting a desired U. H. F. channel at appropriate positioning of the rotor plates 48 with respect to the stator plates 46. The signal at section B is still balanced with respect to ground.

Positioned in secion B is a coupling or loading coil 50 which is mutually coupled to line 44 and which at one end through a feed-through capacitor 51 connects to a coil 52. The other side of output coil 50 also passes through chassis 20 and is connected to a semi-conductor element 54 which has its other side connected to another coil 55 located in section C and operating as the output coil for deriving a signal from the local oscillator 60 housed in section C. Coil 55 which is connected on one side to semi-conductor element 54 is connected on the other side to ground.

Local oscillator 60 consists of oscillator tube 61 generally a high frequency triode, for example a 6AF4, having its plate 62 connected to the B+ supply through a dropping resistor 63 and appropriate choke (not shown) and connected to ground or chassis 20 through a capacitor 64. The grid 65 is connected to a third line 74 having the other end terminated by stator plate 76 of a variable capacitor 77.

Rotor plates 78 of capacitor 77 are ganged to the rotor plates 28 and 48 of capacitors 27 and 47, respectively. The cathode 80 of oscillator is connected to ground through a choke 81, and the filament 82 is connected on one side to ground through a choke 83 and on the other side again through a choke 84 to the filament supply.

It should be noted that both the plate load resistor 63 and filament choke 84 are connected, respectively, to the B+ and the filament supply through leads 85 and 86, respectively, which pass through the chassis 20 by means of feed through capacitors 87 and 88.

The oscillator 60 described above is essentially of the Colpitts type and its frequency of oscillation is determined by the particular length or conformation of line 74 and the value of capacitance obtained by rotation of rotor plates 78 with respect to stator plates 76. The output from oscillator 60, as previously mentioned, is coupled through line 74 into coil 55 which is connected to the mixer 54.

A ground spring 126, described hereinafter in connection with Figures 17, 21A and 21B, is mounted on shield 22 and serves to isolate the coupling between oscillator 61 and mixer 54, to insure controlled injection from the oscillator 61 into mixer 54.

The signal resulting from the mixing action in the crystal of semi-conductor element 54 appears across coil 52 which, as was previously mentioned, is connected at one end to coupling coil 50 and at the other end to a parallel R. C. circuit consisting of a resistance 53 and a capacitance 56 which have their other sides connected to ground, that is, to chassis 20 of the U. H. F. tuner. Coil 52 is center tapped, and the output from coil 52 is applied to the center conductor 57 of a shielded cable 58 terminating in the V. H. F. section or, more particularly, a conductor 57 or shielded cable 58 is connected to the additional stationary contact 330 of stationary contact assembly 301 of the V. H. F. tuner (see Figure 2) so that when the V. H. F. turret 300 is in the U. H. F. receiving position, stationary contact 330 engages the appropriate contact 327 of panel 325 and thus connects through coupling coil 500 the output from the U. H. F. tuner to the input of the V. H. F. tuner now operating as an I. F. amplifier as described hereinafter.

It is now possible to describe the operation of the U. H. F. tuner of the present invention.

U. H. F. channels are selected by proper positioning of the rotor plates 28 and 48 in the preselector sections A and B. At the same time again through the proper rotation of rotor plates 78 with respect to stator plates 76 of oscillator capacitor 77, oscillator 60 is caused to oscillate at the desired frequency, for example, approximately 45 megacycles above the frequency of the incoming U. H. F. signals.

The U. H. F. signals are applied to the mixer 54 through the coupling load 50, while the signals from the local oscillator 60 are applied to the mixer 54 through the coupling load 55. As a result of the mixing action at mixer 54, the intermediate frequency signal, in this case approximately 45 megacycles, will appear across the output coil 52 of mixer 54.

Referring now to the V. H. F. section of this novel V. H. F.-U. H. F. tuner combination shown in the same Figure 1, a balanced V. H. F. input is shown as exemplified by the antenna 400 which through a balanced line 401 connects to a pair of L-C circuits 402. More precisely, each L-C circuit 402 consists of an inductance 403 in parallel with a capacitance 404. One end of each circuit 402 is connected to the terminal of the transmission line 401, and the other end to a coil 406. Thus, coil 406 connects the two output ends of circuits 402, thereby causing a balanced signal to appear across coil 406. Coil 406 is provided with a center tap appropriately connected to the common ground. The two terminals of coil 406 also connect to a pair of stationary contacts of stationary contact assembly 301 and more specifically to contacts 301*a* and 301*b* (see also Figure 2).

During V. H. F. operation, that is, when turret 300 (Figure 2) is rotated through shaft 105 so that a pair of V. H. F. panels such as 310 and 314 (Figures 26 and 27, respectively) engages the stationary assemblies 301 and 302, then contacts 301*a* and 301*b* are engaged by the button contacts 312*a* and 312*d*, respectively, of an antenna panel 310 shown dashed in Figure 1. Stationary contact 301*c* is rigidly connected to ground so that it connects to ground the button contact 312*c* which as seen in Figure 1 is not connected to any of the coils 318 carried on panel 310. Connected across the button contacts 312*a* and 312*b* is the primary coil 318*a* which is shown in detail in Figure 26.

Consequently, coil 318*b* is connected across the other two button contacts 312*d* and 312*e*, respectively, of the same panel 310 and as shown in Figure 26 is mounted on the same coil form 311 on which coil 318*a* is mounted. In fact, they are mounted side by side so as to provide the desired coefficient of coupling. The button contacts 312*d* and 312*e* in the operative position of panels 310 and 314 engage the stationary contacts 301*d* and 301*e* of the stationary contact assembly 301. Stationary contact 301*b* connects to the grid 408 of triode section 410 constituting the first amplifier tube of R. F. amplifier 412 which is of the type known in the art as a cascode amplifier and described in detail in co-ponding application Serial No. 211,959, filed February 20, 1951, assigned to the assignee of the present application.

Resistor 413 is connected between stationary contacts 301*d* and 301*e* and contact 301*e* is further connected to a network consisting of resistor 414 and trimming capacitor 415 and fixed by-pass capacitor 416. To be more specific, stationary contact 301*e* is connected to ground through the series circuit consisting of resistor 414 in series with capacitor 416. This series circuit is shunted by the trimming capacitor 415. Furthermore, the common point of resistor 414 and capacitor 416 is connected to a terminal 417 (see also Figure 3) to which terminal is applied the AGC voltage obtained from the television set proper in a manner well known in the art.

The cathode 418 of triode section 410 as common in cascode amplifiers is connected to ground, and the plate 420 is connected through a coil 421 to the cathode 422 of the second triode section 423 of the cascode amplifier 412. Plate 420 of triode section 410 is by-passed to ground by capacitor 425. The second triode section 423 known as the grounded grid section has the grid 427 of triode 423 connected to ground through a grid resistor 428. Grid 427 is also connected through a feed-through capacitor 430 to a resistor 431 which is connected to another terminal 432 on the terminal block 433 on which is mounted also the previously mentioned terminal 417 (see also Figure 3).

To terminal 432 during operation of the tuner will be applied the correct D. C. voltage necessary for the proper operation of triode section 423. Plate 435 of second triode section 423 is connected to the stationary contacts 302*a* of stationary contact assembly 302 (see also Figure 2). It was previously mentioned that stationary contact assembly 302 is engaged by a V. H. F. panel such as 314 shown in Figure 27 during V. H. F. reception. In other words, button contacts 434 of oscillator converter panel 314 engage the respective stationary contacts 302. More precisely, button contact 434*a* engages contact 302*a* and contact 434*b* engages stationary contact 302*b*.

Mounted on panel 314 are the coils 316*a*, 316*b* and 316*c* of which coil 316*a* is connected between contacts 434*a* and 434*b*, coil 316*b* is connected between contacts 434*c* and 434*d*, and coil 316*c* is connected between contacts 434*e* and 434*f*, all mounted on a single coil form 315 housed on the panel 314.

When there is engagement between stationary contacts 302*a* and 302*b* with the button contacts 434*a* and 434*b*, respectively, then the plate 435 of the second triode section 423 is connected to coil 316*a*, and the other side of the coil 316*a* is connected to a plate load resistor 437 which is connected to the same terminal 432 to which the desired D. C. potential is applied. This connection is made through the feed-through capacitor 450.

The stationary contacts 302*c* and 302*d* are connected across a resistor 451, one end of which is thus the one corresponding to stationary contact 302*d* and the other end is connected to a coupling capacitor 452 which in turn connects to the grid 453 of a multi-electrode electron tube 455. Cathode 456 of tube 455 is connected to ground and between grid 453 and ground is also a network consisting of equal resistors 457 connected in series, across which is a variable capacitor 458. Resistors 457 form a divider network from the center of which is brought out a terminal 458 to be used as a test point in a manner well known in the art.

During V. H. F. operation the stationary contacts 302*c* and 302*d* are connected to the movable contacts 434*c* and 434*d* of the V. H. F. oscillator converter panel 314 and, therefore, to the coil 316*b* mounted on panel 314. Coil 316*b* is mutually coupled to coil 316*a* at the output of the cascode amplifier 412 so that the signal appearing across coil 316*a* corresponding to the desired V. H. F. channel will appear across coil 316 through mutual coupling of the two coils 316*a* and 316*b* and then through the R. C. coupling consisting of coupling capacitor 452 and resistors 457, the signal is applied to the input of tube 455, namely between the grid 453 and the cathode 456 of tube 455. Resistor 451 which is now connected across inductor 316*b* performs a broad banding function.

It should be noted in addition that connected to stationary contact 302*c* is a coupling loop 460 which serves as a band width set coupling loop, in other words, to provide the necessary band width.

The second or screen grid 462 of tube 455 is connected through a dropping resistor 463 to the plate 465 of tube 455. The other end of resistor 463 and, therefore, also the plate 465 are connected to terminal 432 through the same feed-through capacitor 450 and I. F. output coil 467 and dropping resistor 466 in series.

Stationary contacts 302*e* and 302*f* are connected across the fine tuning capacitor 360 and more particularly stationary contact 302*e* is connected to plate 470 (see also Figure 3) of the fine tuning capacitor 360, while stationary contact 302*f* is connected to the other stationary plate 471 of the same capacitor 360. Movable between these two stationary plates 470 and 471, is a dielectric plate 361 (see Figure 3), the control of which will be described hereinafter in connection with Figures 5, 6 and 7.

Stationary contact 302*e* is also connected to the plate 472 of triode 473 which together with the multielectrode electron tube 455 may be enclosed in a single envelope as, for example, in tube 6BZ7. Plate 472 is connected to ground through the trimming capacitor 474. Stationary contact 302*f*, on the other hand, is connected to the grid 475 of tube 473 through a coupling capacitor 476. Grid 475 is also connected to ground through a parallel R. C. network consisting of resistor 477 in parallel with capacitor 478.

When the V. H. F. tuner is positioned for V. H. F. operation, then stationary contacts 302*e* and 302*f* are engaged, respectively, by movable contacts 434*e* and 434*f* of panel 314, thus causing coil 316*c* to be connected across stationary contacts 302*e* and 302*f* and, therefore, across plate 472 and grid 475 of oscillator tube 473.

It should be noted that this circuit is essentially a Colpitts oscillator, the frequency of which is varied in large steps by switching in an appropriate inductance 316*c* mounted on the oscillator converter panel 314. This oscillator is further provided with trimming means as shown schematically by the arrow in the case of inductance 316*c* which will be described hereinafter in connection with Figures 27 and 31 and consists essentially of a conductive screw 320 movable in the interior of the coil form 315 so as to vary the inductance of coil 316*c*. The fine tuning capacitor 360 serves to provide the oscillator with a means for adjusting the oscillator frequency by small amounts after the desired set of panels 310—314 is in engagement with contact assemblies 301 and 302, respectively. Coil 316*c* is also mutually coupled to coil 316*b* since they are mounted on the same panel 314 and thus the heterodyning signal produced by oscillator tube 473 will be coupled into coil 316*b* and thus to the input of tube 455 which during V. H. F. reception will operate as a converter.

For proper operation of this converter, in other words to obtain an I. F. signal of the desired frequency, for example 41 megacycles, oscillator tube 473 must oscillate at a frequency either above or below that of the incoming V. H. F. signals by, that is, 41 megacycles. In this particular embodiment and in a manner now generally accepted, oscillator 473 operates at a frequency above the frequency of the incoming V. H. F. signals by 41 megacycles.

Stationary contact 302*f* is connected to another terminal 480 on the terminal bar 433 through a dropping resistor 481. During the operation of the tuner, a D. C. supply voltage is applied to terminal 480 from the power supply of the television receiver. The connection between resistor 481 and terminal 480 is obtained through a feed-through capacitor 482. Terminal 480 is also connected to a second resistor 484 through the same feed-through capacitor 482. Resistor 484 is connected at its other end to a terminal 485 for the power receptacle 486. This terminal 485 is also appropriately by-passed to ground by a capacitor 487. Terminal 485 is also connected to the resilient stationary contact 335 of the stationary contact assembly 302 which, as will be described hereinafter in connection with Figure 23, is a floating contact when this combination tuner is operated in its V. H. F. range as also seen in the electrical circuit diagram of Figure 1.

To another terminal 490 of receptacle 486 are connected in parallel the filaments 491 and 492 of the single envelope tubes 410—423 and 455—473, respectively. Since the two single envelope tubes 410—423 and 455—473 are positioned one on each side of a central shield which essentially separates the antenna section of the V. H. F. tuner to shield the antenna section from the oscillator section, no oscillator radiation or at least no significant amount of oscillator radiation will appear on the antenna section and, therefore, on the V. H. F. antenna 400.

The two filaments 491 and 492 are connected to each other through a feed-through capacitor 493 positioned in the central shield (not shown) of this V. H. F. tuner. The two filaments 491, 492 are also connected to a terminal 495 mounted on terminal panel 433 to which is applied the necessary filament voltage obtained from the television set proper.

Connected to the I. F. coil 467 is a receptacle 496 from which the I. F. output from the V. H. F. tuner can be applied to the first I. F. amplifier stage of the television receiver in a manner well known in the art, for example through a shielded cable.

During U. H. F. reception, panel 325 is positioned through appropriate rotation of turret 300 so that it engages the stationary assembly 301. At the same time, panel 326 shown in Figure 29 engages the stationary contact assembly 302. Contacts 329 on panel 325 thus engage the corresponding contacts 301, while contact 327, the additional contact characteristic of panel 325, engages the extra stationary contacts 301*a* and 301*b* they essentially connect the circuit of which contact 301*a* is a terminal to ground.

The primary 500 of the I. F. transformer 501 mounted on panel 325 is connected across the movable contacts 327 and 329*c* so that when panel 325 engages the stationary assembly 301, coil 500 will be applied between the extra stationary contact 330 and the stationary contact 301*c*. The secondary 502 of I. F. transformer 501 is connected across the other two movable contacts 329*d* and 329*e* which engage in their operative position the stationary contacts 301*d* and 301*e*, respectively.

Thus, during U. H. F. operation the I. F. output from the U. H. F. tuner is applied through the coupling circuit 501 to the cascode amplifier 412 now operating then as an I. F. amplifier at say 41 megacycles.

When panel 326 which is aligned with panel 325 is in engagement with stationary assembly 302, its contacts 333*a*, 333*b*, 333*c*, 333*d*, 333*e* engage the corresponding stationary contacts 302*a*, 302*b*, 302*c*, 302*d*, 302*e* and since coil 504 is connected across contacts 333*a* and 333*b* acting as the primary of a second I. F. transformer 505, coil 504 is now connected across the stationary contacts 302*a* and 302*b*.

Mounted on the same coil form on which coil 504 is mounted is the secondary winding 506 of the I. F. transformer 505. Coil 506 is connected across the movable contacts 333*c* and 333*d* and is shunted by a resistor 507 to obtain the desired band width. Movable contact 333*e* is open or, in other words, is not connected to any circuit mounted on panel 326.

Also mounted on panel 326, as described hereinafter in connection with Figure 29, is a bridging contact 328 which bridges across two positions of panel 326 which correspond to those of stationary contact 302*f* and stationary contact 335. Thus, when panel 326 is in its operative position, no input coil such as 316*c* is connected between the grid 475 and the plate 472 of oscillator tube 473. In fact, an open circuit is substituted for that coil. Because of the absence of coil 316*c* between the grid 475 and the plate 472 of oscillator 473, there is no D. C. path for the D. C. components and, therefore, oscillator tube 473 is rendered inoperative.

Furthermore, resistor 484 is by-passed since now stationary contact 302*f* is directly connected to stationary contact 335. In other words, the D. C. voltage applied to terminal 480 will now produce a current which flows essentially through resistor 481, stationary contact 302*f*, stationary contact 335 and to the terminal 485 of the power receptacle for the U. H. F. tuner.

It should be clear now that resistor 484 is of considerably larger value than resistor 481, for example 100 kilo-ohms and 3.3 kilo-ohms, respectively. By this means, the desired voltage is applied to the plate of the U. H. F. oscillator tube previously described.

Figure 2:
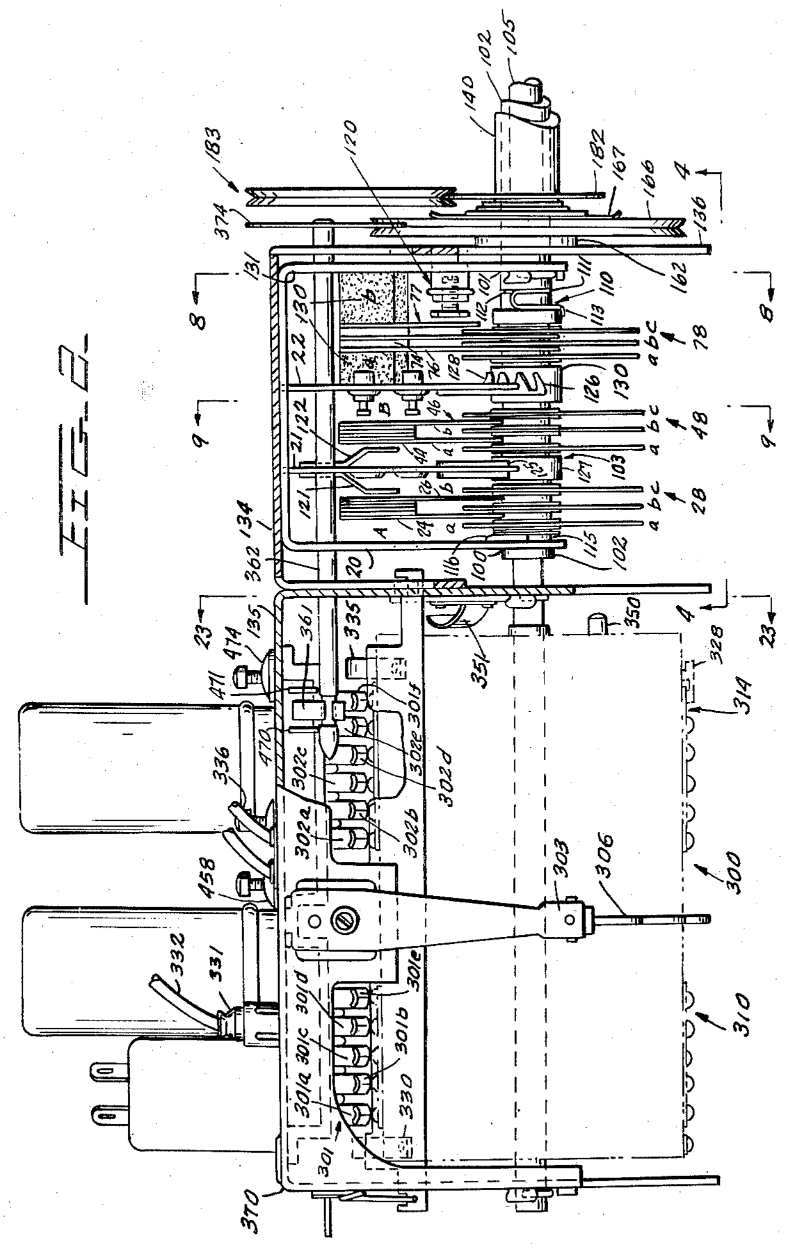

Referring next to Figure 2 showing the combination V. H. F.–U. H. F. tuner of the present invention, it will be seen that the U. H. F. tuner is mounted in a chassis 20 (similar numerals will be used which apply for similar parts shown in Figures 1 and 2). Chassis 20 is an open box provided with two bearing surfaces at 100 and 101.

Shields 21 and 22 are shown as partially dividing sections A and B. Shields 21 and 22 have essentially the same cross-sectional shape as the U. H. F. chassis 20 and are secured thereon in any suitable way.

Rotating in bearings 100 and 101 is the U. H. F. shaft 102 which carries a sleeve 103 provided with the rotors 28, 48 and 78 for the preselector sections A and B and oscillator section C, respectively. The rotor plate structure 28 actually consists in this embodiment of three conductive plates 28*a*, 28*b* and 28*c* secured through appropriate slits in conductive sleeve 103.

Similarly, rotor structure 48 consists of three conductive plates *a*, *b* and *c*, and rotor structure 78 consists of plates *a*, *b* and *c* all similarly connected to the sleeve 103. Sleeve 103 and the rotor structure will be described more in detail hereinafter in connection with Figures 3, 4, 35, 36 and 37.

Sleeve 103 is mounted on the U. H. F. shaft 102 which is actually also a sleeve to permit the rotation of the V. H. F. shaft 105 in the interior of the U. H. F. sleeve 102. Sleeve 103 is fixedly mounted for rotation with sleeve 102, and this is achieved by providing at the front end of the U. H. F. chassis 20 a spring 110. Spring 110 of conductive material is essentially a rectangular element bent so as to provide a biasing action between sleeve 103 and sleeve 102. More precisely, spring 110 is bent so that it forms a U when seen sidewise with one end of the U or one end 111 of the spring being secured in a slot 112 of the U. H. F. shaft 102, while the other end 113 is secured against the front end 114 of sleeve 103.

Thus, spring 110 provides a biasing action of sleeve 103 in the leftward direction with respect to sleeve 102 as shown in Figure 2. It will be seen that this causes the back end 115 of sleeve 103 to bear against an inwardly extending portion 116 of the rear bearing 100. Since lines 24, 44 and 74 are secured to chassis 20 by use of a jig, when the back portion 115 of sleeve 103 bears against portion 116 of bearing 100, then the rotor plates 28, 48 and 78 occupy the desired positions with respect to the lines 24, 44 and 74 and more particularly with respect to the stator structures 26, 46 and 76.

Stator structures 26 and 46 consist essentially of two conductive plates *a* and *b* connected at the end of lines 24 and 44, respectively, while the stator structure 76 consists of three plates *a*, *b*, and *c* of which plates 78*a*, 78*b* and 78*c* while the third stator plate, as will be seen hereinafter, cooperates with the trimming device 120 to provide the necessary trimming for the oscillator capacitor 77.

Lines 24 and 44 are also provided with trimming means such as 121 and 122, respectively, which serve to permit control over tracking. This trimming means consists of bent conductive springs secured in any appropriate way to the shield 21 separating sections A and B.

At these high frequencies, 400 to approximately 900 megacycles, it is known that good grounding must be provided for proper operation. Thus, conductive sleeve 103 is wiped by contacts to ground 125 and 126 where contact 125 consists of a metallic spring secured to shield 21 in appropriate opening to be described hereinafter and bearing against a smooth surface 127 of sleeve 103 (see Figures 21A and 21B). Wiping contact 126 is also of a springy conductive material but is here shaped in the form of a number of fingers such as 128 which bear against also a smooth circular surface 130 of sleeve 103.

Grounding contact structure 126 is also fixedly connected and mounted to sleeve 22 separating sections B and C.

While lines 24 and 44 are grounded to chassis 20 and, therefore, are directly supported on chassis 20 and secured thereto, line 74 is provided with insulating means 130 for securing line 74 on chassis 20. In fact, this insulating means 139 consisting of two sections A and B holds line structure 74 between shield 22 and the inner portion of front wall 131 of chassis 20.

Chassis 20 is itself positioned in the interior of a second housing 134 which in its turn is secured to the housing 135 of the V. H. F. tuner, in this case of the turret type.

Outer housing 134 is provided with a front wall 136 provided with an opening (not shown in Figure 2) for passage of the shafts 102 and 105. It was previously mentioned that shaft 102 rotates in bearings 100 and 101 of U. H. F. chassis 20 and that shaft 102 is actually a sleeve in which the V. H. F. shaft 105 can rotate. This can also be seen at the front end of the U. H. F. tuner as shown in Figure 2.

However, it is seen in Figure 2 that a direct rotation of sleeve 102 causes a 1:1 angular movement of shaft 102 and rotor plates 28, 48 and 78 and since an approximately 360° rotation of shaft 102 must encompass the seventy channels in the U. H. F. range through this 1:1 motion, it will be difficult to accurately select the desired U. H. F. channel.

Thus, the present invention provides means for fine tuning or for accurate channel selection in the U. H. F. range. This means consists basically of friction discs providing essentially a step-down ratio of movement from a controlling shaft 140 to the controlled elements 28, 48 and 78.

It was previously mentioned that shaft 102 rotates in the bearing 101 provided on the front wall 131 of the U. H. F. chassis 20. Shaft 102 is actually provided with a smaller diameter portion 160 (see Figure 34 which shows in detail the U. H. F. shaft 102 and sleeve 103). This smaller diameter section 160 rests in the bearing provided by front wall 131 so as to act as an axially positioning device for shaft 102 with respect to U. H. F. chassis 20.

Shaft 102 is further provided with a striated portion 161 which is engaged by a bushing 162 secured to portion 161 in any suitable way, for example by a key which engages one part of the striated portion 161 of shaft 102.

Bushing 162 has the shape shown in Figure 34 or in other words comprises a metallic element having a portion of larger cross section 164 and a second portion of smaller cross section 165. Riding over this smaller cross section 165 are a main friction element 166, a circular resilient spring member 167 and a metallic disc 168 secured for movement with spring member 167.

Friction member 166 bears against the shoulder 170 while separating the smaller diameter portion 165 from the larger diameter portion 164 of element 162. A lock washer 171 engages a recessed circular portion 172 of the bushing 162 and through resilient disc 167 biases friction member 166 against the shoulder 170 of bushing 162.

Rotation of shaft 102 by means of knob 601 (see Figure 5) causes rotation of bushing 162 and with it lock washer 171. Lock washer 171, however, slips with respect to metallic disc 168 so that a rotation of lock washer 171 is not accompanied by a rotation of friction member 166. Rotation of shaft 102 is transmitted, of course, directly to the portion of shaft 102 which is in the interior of U. H. F. chassis 20.

In this interior portion, as previously mentioned, shaft 102 is positioned in the interior of a sleeve 103 which is provided with the appropriate channels such as at 174 of Figure 34 in which plates 28 can be rigidly mounted for rotation with sleeve 103 and, therefore, for rotation with shaft 102.

To understand more clearly how control is achieved for this U. H. F. tuner, reference is made to Figures 5 and 6. It will there be seen that when knob 601 is rotated from the position of Figure 5 to the position of Figure 6, namely by approximately 90°, shaft 102 and, therefore, sleeve 103 and the rotor assemblies 28, 48 and 78 are similarly rotated by 90°, while friction member 166 retains its original position as clearly seen by a comparison of Figures 5 and 6.

Mounted on shaft 102 on the other side of sleeve 103 with respect to bushing 162 is another sleeve 140 (see Figures 5 and 6) which (see Figure 2) carries at its extremity closer to bushing 162 a metallic disc 182. Metallic disc 182 is engaged by a friction member 183 consisting of two discs placed facing each other and rigidly secured to each other and having a circumferential lip so that a portion of the outer ridge of disc 182 is always engaged by the lips of member 183.

Friction member 183 is secured to a sleeve 184 and a disc 185 where elements 183, 184 and 185 are all rotatable on a pin 190 secured in any suitable way to the front wall of the outer chassis 134 of the U. H. F. tuner of the present invention.

In particular, the outer end of pin 190 is provided with a recessed portion 191 engaged by a lock washer 192 which serves to keep elements 183, 184 and 185 in place on pin 190. Disc 185 is engaged by the previously mentioned friction member 166.

It should be noted that friction member 183 is generally of larger diameter than disk 182 and disk 185 is of considerably smaller dimensions than disc 186 so that an angular rotation of disc 182 results in a considerably small angular rotation of friction member 166 or, in other words, by means of these two discs 182 and 185 and friction members 183 and 186, a mechanical angular step-down device is obtained.

When, therefore, knob 602 secured to sleeve 140 is rotated by a certain angle, for example 90° (see Figure 7 in which the continuous line represents the first position and the dotted lines represent the final position), disc 182 rotating with sleeve 140 and knob 602 rotates by the same amount, namely 90°, and transmits a rotation to friction member 183 in the opposite direction, but since friction member 183 is of larger diameter than disc 182, friction member 183 will rotate by a smaller angle than disc 182.

Friction member 183 being secured to disc 185 causes disc 185 to rotate by the same angle through which friction member 183 rotated. Disc 185 now transmits rotation in the direction opposite to the one in which it moves to friction member 166. However, the diameter of disc 185 is considerably smaller than that of friction member 166 so that the less than 90° rotation of disc 185 results in a very small angular variation of friction member 166 which through the frictional engagement of spring disc 167—disc 168 with lock washer 171 causes a rotation of bushing 162 and, therefore, of shaft 102 and the corresponding rotor assemblies 28, 48 and 78.

The angle of rotation of the rotor structure 28, 48 and 78 is equal to that of friction member 166 since this device can be built so that no slippage occurs when friction member 166 is the driving element and bushing 162 is the driven element.

In Figure 7 it is seen that the angle of rotation of rotor assembly 28, 48 and 78 is considerably less than the angle of rotation obtained in Figure 6 shown dashed in Figure 7 for ease of comparison.

It should be noted, of course, that the rotor plates 28, 48 and 78 because of the two frictional engagements will rotate in the same direction as knob 602.

Thus, when the operator wishes to select a U. H. F. channel, he will first rotate knob 601 to the approximate position of the channel, knob 601 being provided with indicia at every five or ten U. H. F. channels.

After this first tuning operation, the operator will turn knob 602 until the desired channel is received. Thus, it is possible to say that through knob 601 the operator obtains a coarse tuning, while with knob 195 the operator obtains a fine tuning which in this case means the selection of a particular channel in the U. H. F. range.

Crystal 54 of the U. H. F. tuner is mounted to an insulating support 200 through a pair of contacting clips 201 and 202 (see Figures 4 and 16). The outer housing 134 is provided with an opening at 205 (see Figure 16) so as to permit removal of crystal 54 from spring clips 201, 202 if crystal 54 should become defective during operation of the tuner.

An important novel element of the present invention is the curved line shown in detail in Figures 9, 10, 11, 12, 13 and 8.

Referring first to Figures 9, 10 and 11 showing the second preselector line 44, it will there be seen that line 44 consists of four conductive strips having a certain curvature at one end and secured together by means of rivets at 210. The four strips consist of two external ones 211 and 212 and two internal ones 213 and 214, respectively.

The external ones 211 and 212 extend beyond one end of the internal strips 213 and 214 as seen in Figure 11 and these extensions 215 and 216 are shaped in the general form of the stator plates of a variable capacitor. Thus, line 44 with the extensions 215 and 216 combine to form an inductance in series with the stator plates 215 and 216 of a variable capacitance.

The other end 220 of line 44 is secured to the chassis 20 of the U. H. F. tuner and more precisely the chassis 20 is provided with an embossing 221 having an opening engaged by the end 226 of a line such as 44.

One of the rotor plates 48 for line 44 is also shown in Figure 9, but the details of it are in Figures 35 and 36. In Figure 35 it can be seen, in fact, that a rotor plate of the preselector, either 28 or 48, is provided with a logarithmic shape and with appropriate indentations such as at 222 which permit adjustment for tracking as described hereinafter.

It should be noted that the stator plates 215 and 216 constitute the stator assembly denoted by numeral 46 in Figure 1 of capacitor 47. Figure 8 shows line 74 used for tuning the U. H. F. oscillator 61.

Line 74 consists essentially of five strips, two external ones denoted by numerals 230 and 231, a central one 232 and two strips 233 between strips 230 and 232 and 234 between strips 232 and 231. Strips 233 and 234 are shorter than strips 230, 231 and 232, but all strips 231 to 234 are similarly shaped in their common portion. The strips are secured to each other by any appropriate means, for example rivets 235. The shape of these strips is hooklike, and the straight end of the hook 240 terminates and is secured to a metallic member 241 which in turn is secured to the appropriate pins of socket 245 for the oscillator tube 61. In this case, the oscillator tube used is the 6AF4 having two pins corresponding to the grid 65 of tube 61.

Line 74 is also supported on the U. H. F. chassis 20 by means of insulating member 246 and appropriately positioned with respect to shield 22 and the front wall 131 of chassis 20 through insulating means 130 referred to also in connection with Figure 2. Insulating means 130 serve to position line 74 with respect to the rotor plates 78. In fact, line 74 is provided at the hooked end with three plates referred to as assembly 76 in Figures 2 and 1 which for clarity are indicated in Figures 8 and 12 by numeral 250. Plates 250 are extensions of conductive strips 230 and 232 on each side and between which rotor plates 78 shown in Figure 36 can move. Strip 231 is terminated with a different shape extension as shown at 251. One rotor plate 78*a*, in fact, moves between the extension 251 and the extension 250.

Extension 251 also serves as one plate of a trimming capacitor having as the other plate the other end 253 of a screw 120 grounded to the front wall 131 of chassis 20 and rotation of which in one or the opposite direction will cause either a reduction in the gap or an increase in the gap between the flat head 253 of screw 120 and extension 251 of line assembly 74 so as to vary the capacity to ground of line 74.

As will be seen hereinafter, this adjustment which is necessary for appropriate tracking of the oscillator with respect to the preselector stages is accomplished from the front end of this tuner. The rotor plate assembly 78 for oscillator 61 which moves with respect to the stator plates 250 and 251 is shown in Figure 37 which shows a front view of one of the rotor plates 78.

As can be seen, rotor plates 78 are shaped in a manner similar to rotor plates 28 or 48, but they are not identical since the capacitance variation produced through rotation of rotor plates 78 with respect to stator plates 76 is different due to the fact that stator plates 76 are spaced from each other differently than stator plates 26 and 46 and furthermore the frequency of operation of capacitor 77 is different from the frequency of operation of the other two tuning capacitors, namely 27 and 47, since capacitors 27 and 47 must tune through the U. H. F. range or the frequency of the incoming U. H. F. signals, while capacitor 77 tunes to the U. H. F. frequency of the incoming U. H. F. signals plus the intermediate frequency which may be 45 megacycles, for example.

Plates (see Figure 37) may be provided with appropriate indentations such as 260 which also permit adjustment for tracking as described hereinafter. This indentation 260 corresponds to the indentation 222 in the case of rotor plates 28 and 48. The mounting of rotor plates 78 on sleeve 103 is identical to the mounting of rotor plates 28 and 48 on the same sleeve 103 as was described in connection with Figure 34.

Figures 9 and 8 also show the relative positions of the coupling coils whose electrical function was described in connection with Figure 1. In particular, Figure 9 shows the balanced input coupling coil 32 having extensions 262 secured to insulating plate 263 suitably mounted to chassis 20 of the U. H. F. tuner. Insulating plate 263 is provided with contacts 264 to which the input transmission line is connected. Plate 265 on the other side of contacts 264 with respect to insulating plate 263 is connected to ground in any suitable way where the ground is, of course, chassis 20 of the U. H. F. tuner. This contact 265 constitutes the center tap for the input coil 32.

This sub-assembly is more clearly seen in Figures 18A, 18B and 18C. It will be seen there, in fact, that insulating plate 263 is mounted to a sub-chassis 266 through contact 265 which is a band cut out from sub-chassis 266. Insulating plate 263 is secured to metallic element 265 by appropriate means such as a rivet 268 to the other side of which are connected the center ends 270 of input coil 32. The two outer ends 262 of coil 32 are connected to the extending contacts 264 as clearly shown in Figures 18B and 18C. To the extending portions of these contacts 264 are connected the terminals of the input line. Sub-assembly 266 is mounted to chassis 20 through an appropriate opening in the top portion of chassis 20 as shown in Figure 9 and secured to chassis 20 in any suitable way.

Input coil 32 is thus seen to consist of two sections 32*a* and 32*b* joined together at their end 270 and positioned one on each side of the first line 24 at the end at which line 24 is secured to chassis 20. Figure 9 also shows coil 50 which serves to couple the U. H. F. signal from line 44 to the crystal mixer 54 as shown in Figure 1. In fact (see Figure 9), coupling coil 50 is mounted in close proximity to line 44, and its two ends extend through chassis 20 and an insulating plate 200 secured to chassis 20.

As previously mentioned, insulating plate or support 200 is provided also with a pair of contacting clips 201 and 202 (see Figures 3 and 4) to which is removably mounted crystal 54 which acts as the mixer for this U. H. F. tuner. Extending through both chassis 20 and insulating support 200 through a feed through capacitor 51 is the other end 270 of coil 50 through which the desired intermediate frequency can be obtained as shown in Figure 1.

Insulating support 200 represents, in fact, another sub-chassis which can be assembled separately from the other components of the tuner and after the assembly of sub-chassis 200 can be secured to the chassis 20 of the U. H. F. tuner in any suitable way, for example by means of rivets.

Figure 8 shows the coupling coil 55 which serves to couple the output from oscillator 61 into the mixer 54. Thus, coil 55 is shown in close proximity to the previously mentioned plate 241 at the end of line 240 where, in other words, line 240 is electrically connected to the grid pins of socket 245. Coupling coil 55 has one end grounded to the chassis 20 and the other end extends through chassis 20 and the insulating support 200 and is connected to the side of crystal 54 opposite to the one at which coupling coil 50 is connected. In other words, coupling coil 55 serves to inject in the mixer the local oscillator signal and its coupling with respect to line 240 is such as to provide the correct amount of mixer injection.

The bottom view of socket 245 and a cross-sectional view of socket 245 are shown, respectively, in Figures 14A and 14B. Socket 245 is of the type generally used in connection with U. H. F. tubes such as the 6AF4 so constructed, in other words, that the pins of the socket 245 are very short. Figures 14A and 14B particularly serve to show how plate 241 is mounted to socket 245.

It will be seen, in fact, that plate 241 bridges across the two pins of socket 245 which correspond to the grid pins of the tube being used, for example a 6AF4 triode. Plate 241 is also mechanically secured to the socket 245 through one extension 275 into the center opening of socket 245 soldered to this center opening which is provided generally with a metallic cylindrical member.

The relative position of socket 245, insulating plate 200 or sub-chassis 200 and the antenna sub-chassis 266 are also shown in Figure 17 which also shows the mounting on the chassis 20 of the wiping members 125 and 126 described in connection with Figures 21A and 21B.

Shaft 105 (see Figure 2) operates as previously mentioned the V. H. F. channel selector. More specifically, it rotates the turret 300 of the V. H. F. tuner with respect to the stationary contact assembly 301 and 302 where the stationary contact assembly 301 corresponds to the antenna section of the V. H. F. tuner, while stationary contact 302 corresponds to the oscillator converter section of the V. H. F. tuner as described with reference to the circuit diagram of Figure 1.

The V. H. F. tuner is preferably of the type described in Patent No. 2,496,183 which can recevie all the twelve channels in the V. H. F. band and is provided with cooperating positioning means 303 described in the above-mentioned patent. However, some important modifications were made on the V. H. F. tuner for proper operation of the present V. H. F.–U. H. F. combination tuner which will be mentioned in the course of the description of the V. H. F. tuner.

Turret 300 consists of three spaced discs 305, 306 and 307 rigidly secured to shaft 105 (se Figure 22) and provided with appropriate indentations (see also Figures 23 or 24 and 25) which are engaged by matching ends of the V. H. F. panels such as those shown in Figures 26 and 27 where Figure 26 shows the antenna panel and Figure 27 the oscillator converter panel. Antenna panel 310 is of plastic material on which a coil form 311 carries the coupling coils 318 or the input transformer of the V. H. F. tuner described in Figure 1 and a series of movable contacts 312 which selectively engage the stationary contacts 301 and to which are connected the terminals of the input coupling device of the V. H. F. tuner.

The oscillator converter panel 314 is also of plastic material and provided with a coil form 315 on which are wound three coils 316 described also in connection with Figure 1. In particular, one of the coils 316 serves for tuning the oscillator of the V. H. F. tuner as described in connection with Figure 1 and is provided with a trimming screw 320 not visible in Figure 27 but the head of which is visible in Figure 31. The threads of screw 320 are engaged by a wire spring 321 which thus serves to position screw 320 in the coil form 315 and, therefore, with respect to the oscillator coil wound on coil form 315 closest to the wire spring 321. Wire spring 321 engages the threads of screw 320 through an opening in coil form 315 as shown in Figure 27.

Panels 310 and 314 are mounted on the discs 305, 306 and 307 as shown in Figures 2, 23, 24 and 25 and as described in the previously mentioned patent. It should be noted, however, that in this modification although there are only twelve V. H. F. channels in operation, the turret is provided with thirteen positions, the thirteenth position corresponding to the panels 325 and 326 shown in Figures 28 and 29, respectively, which when connected to the stationary contact assemblies 301 and 302 through rotation of shaft 105 and, therefore, of turret 300 to that particular position transform the V. H. F. tuner into an I. F. amplifier as described in connection with Figure 1.

To permit this conversion, panels 325 and 326 are different from panels 310 and 314 in that panel 325 has an additional contact 327 when compared with the contacts 312 of panel 310 and panel 326 has an angularly shaped contact 328 instead of one of the end button contacts of panel 314.

When panels 325 and 326 or better their contacts engage the stationary assemblies 301 and 302, the extra contact 327 of panel 325 connects to an additional stationary contact 330 (see Figure 2) to which is connected through an appropriate coaxial plug 331 the coaxial line 332 from the output of mixer 54 of the U. H. F. tuner. To contact 327 is connected the primary of a tuning-coupling element as described in connection with Figure 1 which is connected during U. H. F. reception to the input of the R. F. amplifier of the V. H. F. tuner now operating as an I. F. amplifier.

The rectangular contact 328 of panel 326 bridges the sixth and seventh contact positions of panel 326 indicated at 331 and 332 so that when panel 326 is in engagement with stationary assembly 302, the rectangular member 328 will connect the stationary contact **302*f* of assembly 302 to a stationary contact 335 (see Figure 24) which through an appropriate lead, for example 336 shown in Figure 2, carries the B+ voltage which is applied at the stationary contact 302*f* to the plate 62 of the U. H. F. oscillator 61 through a plate load resistor 63** as described in connection with Figure 1.

It should be noted that the contact lead of panel 326 is not connected to any circuit element so that when panel 326 is in operative position the V. H. F. local oscillator is not operating and bleeder resistor 484 in the plate circuit of oscillator tube 473 through engagement of stationary contacts 335 and **302*f* with connecting link 334 mounted also on panel 326. By means of the resistor 484 it is possible to keep a low voltage on the V. H. F. oscillator tube 473 and thus prevent cathode poisoning. At the same time the R. F. amplifier tube and the converter tube of the V. H. F. tuner operate as an I. F. amplifier. The particular circuit elements mounted on panels 325 and 326** are more clearly described in connection with Figure 1.

Front disc 307 of the V. H. F. tuner is also provided with a pin 350 riveted to disc 307 so that when the V. H. F. tuner is in the position corresponding to U. H. F. reception, that is when panels 325 and 326 engage the stationary assemblies 301 and 302, pin 350 engages a wiping contact 351 (see also Figure 2) which connects to a lead so that the lead (not shown) is appropriately grounded through rivet 350 and disc 307 and the shaft 105 of the V. H. F. tuner.

This lead, not visibly shown but schematically indicated in Figure 1 at 352, serves to provide the U. H. F. section with a ground corresponding to the one of disc 307 of the V. H. F. section. This particular schematic diagram is shown within a dotted rectangle in Figure 1, being part of the electrical circuit of Figure 1.

Figure 25 shows the spring member 355 which serves to retain the panels 310 or 314 against radial movement. Figure 23 shows the position of the stationary contact 335 when one of the V. H. F. panels such as 314 is in engagement with assembly 302, that is during V. H. F. reception.

As seen in Figure 23, the stationary contact 335 is non-operative. Figure 23 also shows that the wiping contact 351 is now not in engagement with the pin 350 during V. H. F. reception. Figure 24 shows the V. H. F. tuner as positioned for U. H. F. reception. Here panel 326 is in engagement with the contact assembly 302 and, therefore, the stationary contact 335 engages the rectangular contact 328 on panel 326 as previously described. Here wiper 351 has been engaged by pin 350.

The V. H. F. tuner is provided with a fine tuning capacitor 360 having a movable dielectric plate 361 (see Figures 2 or 5, 6 and 7, for example) such that its movement with respect to the stationary plates serves to vary by a small amount the frequency of oscillation of the V. H. F. oscillator of the present invention. This permits fine tuning in each V. H. F. channel.

The dielectric plate 361 is rotated through a shaft 362 to which it is loosely mounted so that when dielectric plate 361 is at one end of its travel determined for example (see Figure 7) by one end of a slot 369 of the V. H. F. chassis 370, shaft 362 can now continue to rotate also with respect to dielectric plate 361. This particular engagement between dielectric plate 361 and shaft 362 is shown in Figures 5, 6, and 7 and is obtained by providing a recess 371 at one end of shaft 362, this recess 371 being engaged by a fork-shaped end 372 of dielectric plate 361.

While this engagement is sufficiently tight so that when dielectric plate 361 is free to rotate it will rotate when operated by shaft 362, it is on the other hand sufficiently loose so that when dielectric plate 361 arrives at one of its extreme positions, one of which is indicated in Figure 7, shaft 362 will be able to rotate with respect to dielectric plate 361. At the other end of shaft 362 is a disc 374 which acts as a friction disc in engagement with disc 166 described previously in connection with the fine tuning motion of the U. H. F. tuning elements so that when knob 195 is rotated causing rotation of sleeve 140, this rotation is transmitted through discs 182, 183, 185, 160 and 374 to shaft 362 and, therefore, to the dielectric panel 361 of this V. H. F. fine tuner.

When, on the other hand, knob 180 is rotated, and it will be remembered that knob 180 serves to provide coarse U. H. F. tuning, the V. H. F. fine tuning dielectric plate 361 is not operated since none of the friction discs will be operated.

Figures 30 and 31 show the respective positions of disc 160 for trimming the U. H. F. oscillator and the V. H. F. oscillator. More specifically, friction member 166 through rotation of sleeve 140 has been positioned so that one of the four openings 380 of friction member 166 faces directly either the U. H. F. or the V. H. F. oscillator trimming screws of the present U. H. F.–V. H. F. tuner. When, therefore, it is desired to adjust the frequency of oscillation of the U. H. F. oscillator 61 so that proper tracking is obtained, it is only necessary (see Figure 30) to move friction member 166 through sleeve 140 until one of the openings 380 faces screw 120, thus permitting the insertion of a screw driver to engage the head of screw 120 through opening 380.

Figure 31 shows, on the other hand, the relative positions of the friction member 166 with respect to the U. H. F. chassis 20 when it is desired to adjust any one of the oscillator coils mounted on panels 314 in the V. H. F. tuner as described in connection with Figure 27. In fact, both the front and end wall of U. H. F. chassis 20 are provided with openings which are aligned with an opening in the front end of the V. H. F. chassis 370. This opening in the V. H. F. chassis is not shown but is positioned so that it faces the head of screw 320 for trimming the oscillator coil of the V. H. F. tuner when the V. H. F. tuner is selecting the particular channel.

In other words, if the serviceman desires to adjust the frequency of oscillation of the V. H. F. oscillator for reception of V. H. F. channel 5, the V. H. F. turret 300 is first rotated through operation of shaft 105 until the correct set of panels 312 and 314 corresponding to channel 5 is in engagement with the stationary assemblies 301 and 302. Then the fine tuning or vernier knob 602 is rotated and, therefore, also sleeve 140 to cause, as described in reference to Figures 5, 6 and 7, the dielectric plate 361 of the fine tuner of the V. H. F. tuner to move to one end of its travel.

If knob 602 continues to rotate in the same direction after a certain amount of rotation, one of the openings 380 of friction member 166 will face the corresponding aligned openings in the U. H. F. chassis 20 and the V. H. F. chassis 370 so as to permit the insertion of a screw driver until it engages the head of the screw 320, thus permitting the adjustment of the frequency of oscillation of the V. H. F. oscillator while the V. H. F. tuner is set for reception of that particular channel.

In other words, the present V. H. F.–U. H. F. tuner combination is provided with means for adjusting individually the frequency of oscillation of each of the V. H. F. channels and the frequency of oscillation of the U. H. F. oscillator 61 from the front end of the tuner. A similar opening (not shown) exists also at the rear end of the V. H. F. tuner to permit the adjustment of a screw similar to screw 320 and, therefore, the adjustment of the frequency to which the coils 318 (see Figure 26) of the antenna panel 310 are tuned.

Referring finally to Figures 41, 42 and 43 showing the controlling knobs of the V. H. F.–U. H. F. tuner combination of the present invention, it will there be seen that the center knob 600 is provided with indicia 2 to 13 and a position between 2 and 13 marked "U. H. F." Knob 600 engages shaft 105, which as previously described in connection with Figure 2, operates the V. H. F. turret 300.

When, therefore, the operator desires to tune his television set to a V. H. F. channel, for example channel 9, knob 600 is rotated by the operator until number 9 appears under an appropriate fixed indicator such as an arrow.

If, however, the operator desires a U. H. F. channel, then he must rotate knob 600 until the indicia U. H. F. appears under the same arrow or indicating device.

Concentric with knob 600 is the U. H. F. direct control knob 600 which engages sleeve 102 and is provided with indicia such as 20, 30, 40, etc. to indicate the ranges of U. H. F. channels being tuned. Thus, after positioning knob 600 to the "U. H. F." position, the operator should rotate knob 601 until the stationary indicator indicates approximately the correct position of the U. H. F. channel. For example, if the operator desires channel 33, knob 601 should be rotated until the stationary indicating device (not shown) appears approximately between the indicia 30 and 40 of knob 601.

Concentric with knobs 600 and 601 is the third knob 602 which operates sleeve 140. Sleeve 140, as described in connection with Figures 5, 6 and 7, serves to operate simultaneously the V. H. F. fine tuning device and the U. H. F. tuning elements through a step-down friction device so that, for example, eight rotations of knob 602 and, therefore, of sleeve 140 correspond to a single rotation of sleeve 103 carrying the U. H. F. rotor plates 28, 48 and 78.

Continuing now the explanation of the procedure to be followed by the operator to receive channel 33, after the previously mentioned operation of knobs 600 and 601, the operator may now select channel 33 by rotating knob 602. It should be noted that knob 602 does not have any indicia since the rotation of knob 602 causes not only rotation of sleeve 140 but also rotation of sleeve 102 and, therefore, of knob 601 but at a reduced rate.

To summarize the above, when the operator wants to receive a V. H. F. channel, he rotates first knob 600 to select a given V. H. F. channel and then, if necessary, rotates knob 602 for fine tuning within the V. H. F. channel.

When he wants to receive an U. H. F. channel, he must set first knob 600 to the U. H. F. position and then through the combined operation of knobs 601 and 602 select the desired U. H. F. channel through a continuous operation.

It should be noted that the connection between knobs 600, 601 and 602 with the shafts 105, 102 and 140, respectively, is obtained in any suitable way, for example by engagement of proper flats on the shafts by cam portions in the interior of knobs 600, 601 and 602.

In one embodiment of the present invention, the following magnitudes for the electrical constants and the following tubes were used:

| | |
|---|---|
| Feed-through capacitor **51** | 30 micromicrofarads. |
| Resistor **53** | 100 ohms. |
| Crystal mixer **54** | 1N82A. |
| Capacitor **56** | 1500 micromicrofarads. |
| Tube **61** | 6AF4. |
| Resistor **63** | 1000 ohms. |
| Capacitor **64** | 200 micromicrofarads. |
| Feed-through capacitor **87** | 1000 micromicrofarads. |
| Feed-through capacitor **88** | 1000 micromicrofarads. |
| Tube **410—423** | 6BZ7 double triode. |
| Resistor **413** | 22 kilo-ohms. |
| Resistor **414** | 47 kilo-ohms. |
| Capacitor **415** | 3–12 micromicrofarads. |
| Capacitor **416** | 1500 micromicrofarads. |
| Terminal **417** | A. G. C. |
| Capacitor **425** | 3 micromicrofarads. |
| Capacitor **426** | .5–3 micromicrofarads. |
| Resistor **428** | 820 kilo-ohms. |
| Capacitor **429** | 47 micromicrofarads. |
| Feed-through capacitor **430** | 800 micromicrofarads. |
| Resistor **431** | 470 kilo-ohms. |
| Resistor **432** | 1500 ohms. |
| Feed-through capacitor **450** | 800 micromicrofarads. |
| Resistor **451** | 6.8 kilo-ohms. |
| Capacitor **452** | 47 micromicrofarads. |
| Capacitor **458** | .5–3 micromicrofarads. |
| Resistor **457** | 100 kilo-ohms. |
| Tube **455—473** | 6U8. |
| Resistor **463** | 100 kilo-ohms. |
| Capacitor **464** | 220 micromicrofarads. |
| Resistor **466** | 8.2 kilo-ohms. |
| Capacitor **474** | .5–3 micromicrofarads. |
| Capacitor **476** | 10 micromicrofarads. |
| Resistor **477** | 10 kilo-ohms. |
| Capacitor **478** | 5 micromicrofarads. |
| Resistor **481** | 3.3 kilo-ohms. |
| Resistor **484** | 100 kilo-ohms. |
| Feed-through capacitor **482** | 800 micromicrofarads. |
| Resistor **407** | 5.6 kilo-ohms. |
| Potential to be applied to terminal **432** | +240–260 volts. |
| Potential to be applied to terminal **480** | +145–155 volts. |
| Potential to be applied to terminal **433** | 6.3 volts A. C. |

In the foregoing the invention has been described solely in connection with specific illustrative embodiments thereof. Since many variations and modifications of the invention will now be obvious to those skilled in the art, I prefer to be bound not by the specific disclosures herein contained but only by the appended claims.

I claim:

1. A frequency selector operable in the V. H. F. and U. H. F. ranges comprising a V. H. F. tuning section for selecting V. H. F. channels and an U. H. F. tuning section for selecting U. H. F. channels, said V. H. F. tuning section comprising a stationary circuit and tuning means for said stationary circuit mounted circularly to form a turret; an operating shaft for rotating said turret to discretely select one of said V. H. F. channels; said U. H. F. tuning section comprising a plurality of tuned circuits each of said tuned circuits consisting of a curvilinear conductive member, conductive plates terminating said curvilinear conductive member at one end thereof; a sleeve coaxial with respect to said shaft, said sleeve being conductive and having mounted thereon a plurality of conductive rotor plates; said rotor plates being logarithmically shaped and being movable with respect to said conductive plates; rotation of said sleeve continuously tuning said U. H. F. tuning section through the complete U. H. F. range; a second sleeve surrounding said first sleeve and being coaxial to said shaft; fine tuning means being mounted on said V. H. F. tuning section and a step down friction mechanism coupling said second sleeve to said first sleeve; rotation of said second sleeve during U. H. F. operation causing rotation of said rotor plates with respect to said first conductive plates at a reduced angular velocity.

2. A frequency selector operable in the V. H. F. and U. H. F. ranges comprising a V. H. F. tuning section for selecting V. H. F. channels and a U. H. F. tuning section for selecting U. H. F. channels, said V. H. F. tuning section comprising a stationary circuit and tuning means for said stationary circuit mounted circularly to form a turret; an operating shaft for rotating said turret to discretely select one of said V. H. F. channels; said U. H. F. tuning section comprising a plurality of tuned circuits, each of said tuned circuits consisting of a curvilinear conductive member, conductive plates terminating said curvilinear conductive member at one end thereof: a sleeve coaxial with respect to said shaft, said sleeve being conductive and having mounted thereon a plurality of conductive rotor plates; said rotor plates being logarithmically shaped and being movable with respect to said conductive plates; rotation of said sleeve continuously tuning said U. H. F. tuning section through the complete U. H. F. range; a second sleeve surrounding said first sleeve and being coaxial to said shaft; fine tuning means being mounted on said V. H. F. tuning section and a step down friction mechanism coupling said second sleeve to said first sleeve; rotation of said second sleeve during U. H. F. operation causing rotation of said rotor plates with respect to said first conductive plates at a reduced angular velocity; rotation of said second sleeve during V. H. F. reception operating said fine tuning device for providing fine tuning at each V. H. F. channel.

3. A frequency selector operable in the V. H. F. and U. H. F. ranges comprising a V. H. F. tuning section for selecting V. H. F. channels and a U. H. F. tuning section for selecting U. H. F. channels, said V. H. F. tuning section comprising a stationary circuit and tuning means for said stationary circuit mounted circularly to form a turret; an operating shaft for rotating said turret to discretely select one of said V. H. F. channels; said U. H. F. tuning section comprising a plurality of tuned circuits, each of said tuned circuits consisting of a curvilinear conductive member, conductive plates terminating said curvilinear conductive member at one end thereof; a sleeve coaxial with respect to said shaft, said sleeve being conductive and having mounted thereon a plurality of conductive rotor plates; said rotor plates being logarithmically shaped and being movable with respect to said conductive plates; rotation of said sleeve continuously tuning said U. H. F. tuning section through the complete U. H. F. range; a second sleeve surrounding said first sleeve and being coaxial with said shaft; fine tuning means being mounted on said V. H. F. tuning section and a step down friction mechanism coupling said second sleeve to said first sleeve; rotation of said second sleeve during U. H. F. operation causing rotation of said rotor plates with respect to said first conductive plates at a reduced angular velocity; rotation of said second sleeve during V. H. F. reception operating said fine tuning device for providing fine tuning at each V. H. F. channel; said V. H. F. turret having a plurality of positions corresponding to the V. H. F. channels and an additional position corresponding to the U. H. F. reception; the tuning means corresponding to said additional position mounted on said turrets transforming said V. H. F. tuning section into a two stage I. F. amplifier and connecting said I. F. amplifier input to the output of said U. H. F. section during U. H. F. reception.

4. A frequency selector for conversion of ultra-high frequency signals to fixed intermediate frequencies, R. F. tuning means, oscillator means and converter means; each of said tuning means comprising a distributed inductor, a variable capacitor terminating said inductor, common operating means for simultaneously varying the capacitance of said capacitor; the distributed inductor for said R. F. and converter tuning means comprising a curvilinear transmission line mounted at one and and having stator plates of said variable capacitor at the other end; the distributed inductor of said oscillator tuning means comprising also a curvilinear transmission line, a multi-electrode tube coupled to said oscillator tuning means for producing local oscillation, said oscillator distributed inductor being connected at one end to the control grid of said oscillator tuning means; a plurality of stator plates for said oscillator variable capacitor mounted at the other end of said curvilinear transmission line; a metallic chassis, the said U. H. F. tuning means being mounted in said metallic chassis; a longitudinal slug movable along its axis and mounted on the front end of said chassis opposite the first of said oscillator stationary plates, movement of the tuning slug with respect to said plate determining the frequency range of operation of said oscillator.

5. A frequency selector for conversion of ultra-high frequency signals to fixed intermediate frequencies, R. F. tuning means, oscillator means and converter means; each of said tuning means comprising a distributed inductor, a variable capacitor terminating said inductor, common operating means for simultaneously varying the capacitance of said capacitor; the distributed inductor for said R. F. and converter tuning means comprising a curvilinear transmission line mounted at one and and having stator plates of said variable capacitor at the other end; the distributed inductor of said oscillator tuning means comprising also a curvilinear transmission line, a multi-electrode tube coupled to said oscillator tuning means for producing local oscillation, said oscillator distributed inductor being connected at one end to the control grid of said oscillator tuning means; a plurality of stator plates for said oscillator variable capacitor mounted at the other end of said curvilinear transmission line; a metallic chassis, the said U. H. F. tuning means being mounted in said metallic chassis; a longitudinal slug movable along its axis and mounted on the front end of said chassis opposite the first of said oscillator stationary plates, movement of the tuning slug with respect to said plate determining the frequency range of operation of said oscillator tube; conductive plates between each of said tuning means for shielding each of said tuning means from the other; each of said shields having appropriate means for appropriately coupling said tuning means; said coupling means having openings in said shields for coupling at the high U. H. F. frequencies and having grounding elements for coupling at the low ultra-high frequencies.

References Cited in the file of this patent

UNITED STATES PATENTS

| | | |
|---|---|---|
| 1,819,905 | Lyons | Aug. 18, 1931 |
| 2,247,213 | Trevor | June 24, 1941 |
| 2,272,062 | George | Feb. 3, 1942 |
| 2,422,454 | Weiss | June 17, 1947 |
| 2,453,489 | Bruntil et al. | Nov. 9, 1948 |
| 2,491,480 | Davis et al. | Dec. 20, 1949 |
| 2,665,377 | Krepps | Jan. 5, 1954 |